(12) United States Patent
Tung et al.

(10) Patent No.: US 10,877,629 B2
(45) Date of Patent: Dec. 29, 2020

(54) CONVERSION AND DISPLAY OF A USER INPUT

(71) Applicant: Tung Inc., Los Angeles, CA (US)

(72) Inventors: Mark Tung, Los Angeles, CA (US); Isaac Cheah, Los Angeles, CA (US); Brandon Foster, Los Angeles, CA (US)

(73) Assignee: Tung Inc., Los Angeles, CA (US)

( * ) Notice: Subject to any disclaimer, the term of this patent is extended or adjusted under 35 U.S.C. 154(b) by 260 days.

(21) Appl. No.: 15/849,667

(22) Filed: Dec. 21, 2017

(65) Prior Publication Data

US 2018/0130094 A1 May 10, 2018

Related U.S. Application Data

(63) Continuation-in-part of application No. 15/293,161, filed on Oct. 13, 2016, now Pat. No. 10,528,219.

(51) Int. Cl.
*G06F 3/0482* (2013.01)
*G06Q 30/02* (2012.01)
(Continued)

(52) U.S. Cl.
CPC ........ *G06F 3/0482* (2013.01); *G06F 3/04842* (2013.01); *G06F 3/04886* (2013.01);
(Continued)

(58) Field of Classification Search
CPC . G06F 3/0482; G06F 3/04817; G06F 3/04842
See application file for complete search history.

(56) References Cited

U.S. PATENT DOCUMENTS

| 5,761,689 A | 6/1998 | Rayson et al. |
| 5,802,534 A | 9/1998 | Hatayama et al. |

(Continued)

FOREIGN PATENT DOCUMENTS

| KR | 101161869 B1 | 7/2012 |
| WO | 2007080570 A1 | 7/2007 |
| WO | 2009128838 A1 | 10/2009 |

OTHER PUBLICATIONS

Craig, What You Need to Know About Google Maps' Promoted Pins, Sep. 22, 2016, retrieved Jan. 23, 2020 at https://unbounce.com/ppc/google-maps-promoted-pins/ (Year: 2016).*

(Continued)

*Primary Examiner* — William Spieler
(74) *Attorney, Agent, or Firm* — Zeller IP Group, PLLC; Kyle M. Zeller

(57) ABSTRACT

Described herein are methods and systems allowing a company to market and advertise its brands, products and/or services in a mobile platform by use of an application converting a user input into a corresponding branded icon, logo or image and displaying the same. The user input is in the form of a text entry containing a pre-defined term corresponding to one or more branded images, icons or logos. By allowing a user to select one of the displayed branded images or logos, the application is able to trigger a number of third party applications associated with the selected branded image, icon or logo.

12 Claims, 44 Drawing Sheets

(51) Int. Cl.
*G06F 3/0484* (2013.01)
*G06F 16/29* (2019.01)
*G06F 16/54* (2019.01)
*G06F 16/58* (2019.01)
*G06F 16/9537* (2019.01)
*G06F 3/0488* (2013.01)
*G06Q 50/00* (2012.01)
*G06F 3/0481* (2013.01)

(52) U.S. Cl.
CPC .............. *G06F 16/29* (2019.01); *G06F 16/54* (2019.01); *G06F 16/5866* (2019.01); *G06F 16/9537* (2019.01); *G06Q 30/0261* (2013.01); *G06Q 30/0267* (2013.01); *G06Q 30/0277* (2013.01); *G06F 3/04817* (2013.01); *G06Q 50/01* (2013.01)

(56) References Cited

U.S. PATENT DOCUMENTS

| | | | |
|---|---|---|---|
| 7,051,019 | B1 | 5/2006 | Land et al. |
| 8,164,599 | B1* | 4/2012 | Kadous ............... G01C 21/20 345/634 |
| 8,166,418 | B2 | 4/2012 | Williams |
| 8,701,032 | B1 | 4/2014 | Zhai et al. |
| 9,959,340 | B2 | 5/2018 | Li et al. |
| 2003/0023451 | A1 | 1/2003 | Willner et al. |
| 2007/0266090 | A1 | 11/2007 | Len |
| 2008/0071612 | A1 | 3/2008 | Mah et al. |
| 2008/0298342 | A1* | 12/2008 | Appleton ............... G06Q 30/02 370/351 |
| 2008/0301643 | A1* | 12/2008 | Appleton ............... G06Q 30/02 717/124 |
| 2009/0124268 | A1 | 5/2009 | McNamara et al. |
| 2009/0263026 | A1* | 10/2009 | Verne .................. G06Q 30/0241 382/209 |
| 2010/0070896 | A1 | 3/2010 | Attinger |
| 2010/0159967 | A1* | 6/2010 | Pounds ................. H04L 51/14 455/466 |
| 2010/0179991 | A1* | 7/2010 | Lorch ................. H04M 1/7253 709/206 |
| 2011/0320317 | A1* | 12/2011 | Yuan .................. G06Q 30/0601 705/26.61 |
| 2012/0089669 | A1 | 4/2012 | Berg et al. |
| 2013/0124367 | A1* | 5/2013 | Ray ........................ H04L 67/02 705/26.62 |
| 2013/0159431 | A1 | 6/2013 | Berry et al. |
| 2013/0159919 | A1 | 6/2013 | Leydon |
| 2014/0057659 | A1* | 2/2014 | Udeshi ................. H04W 4/029 455/456.3 |
| 2014/0115070 | A1 | 4/2014 | Virtanen et al. |
| 2014/0324414 | A1 | 10/2014 | Zhang et al. |
| 2015/0127753 | A1 | 5/2015 | Tew et al. |
| 2015/0134448 | A1 | 5/2015 | Tung et al. |
| 2015/0161147 | A1* | 6/2015 | Zhao .................. G06F 16/7837 707/772 |
| 2015/0185991 | A1* | 7/2015 | Ho ........................ G06F 3/0484 715/771 |
| 2015/0193819 | A1* | 7/2015 | Chang ................ G06Q 30/0252 705/7.19 |
| 2015/0356603 | A1 | 12/2015 | Tung et al. |
| 2016/0063110 | A1* | 3/2016 | Shoup ................. G06F 16/2428 707/706 |
| 2017/0046045 | A1 | 2/2017 | Tung et al. |

OTHER PUBLICATIONS

Gruman, Android for Work brings container security to Google Play apps, retrieved Jan. 23, 2020 at https://www.infoworld.com/article/2889074/android-for-work-brings-container-security-to-google-play-apps.html (Year: 2015).*

Henry, the Best Text Expansion App for Android, Sep. 29, 2011, accessed Aug. 14, 2015 at http://lifehacker.com/5844895/the-best-text-expansion-app-for-android.

Rawlinson, Android: Change Keyboard Based on App Using Tasker, Oct. 2, 2012, accessed Aug. 14, 2015 at http://code.rawlinson.us/2012/10/android-change-keyboard-based-on-app.html.

* cited by examiner

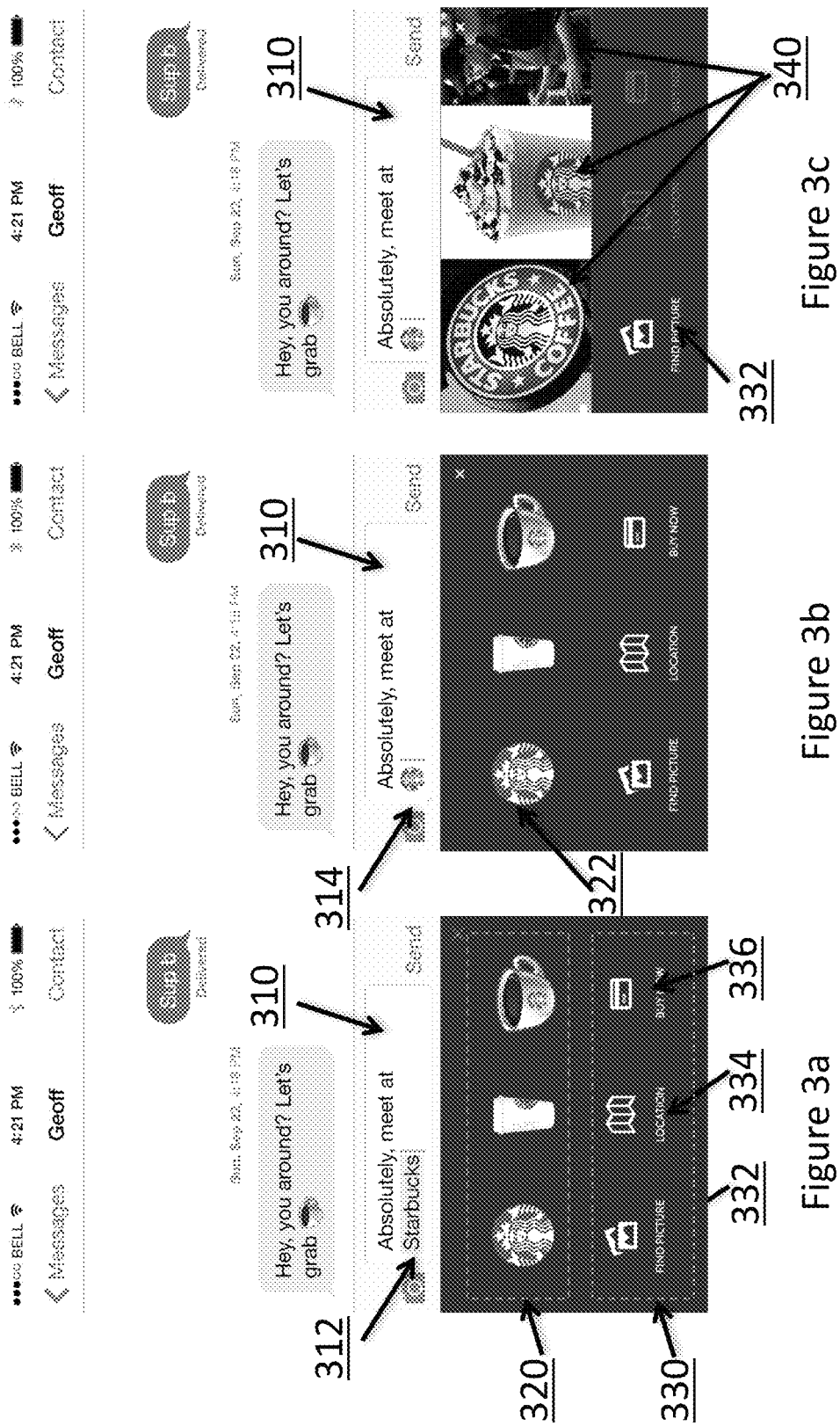

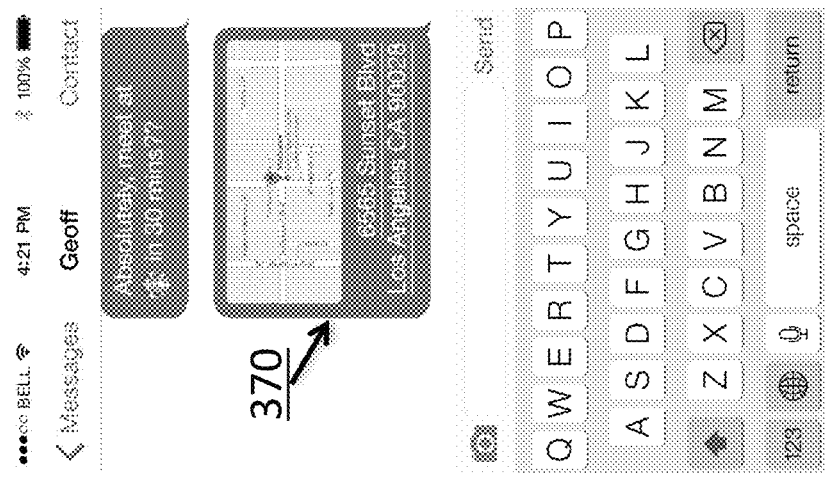
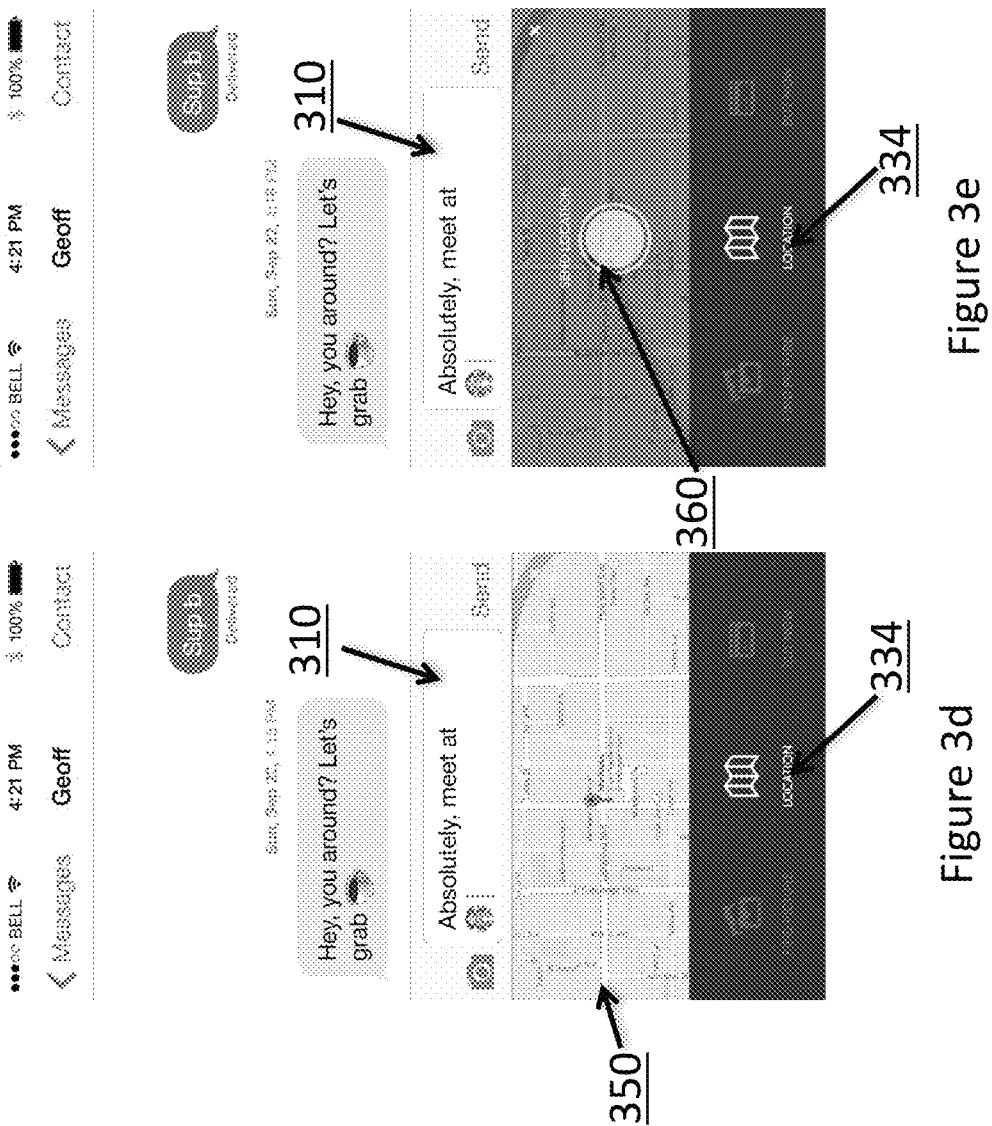
Figure 3f
Figure 3e
Figure 3d

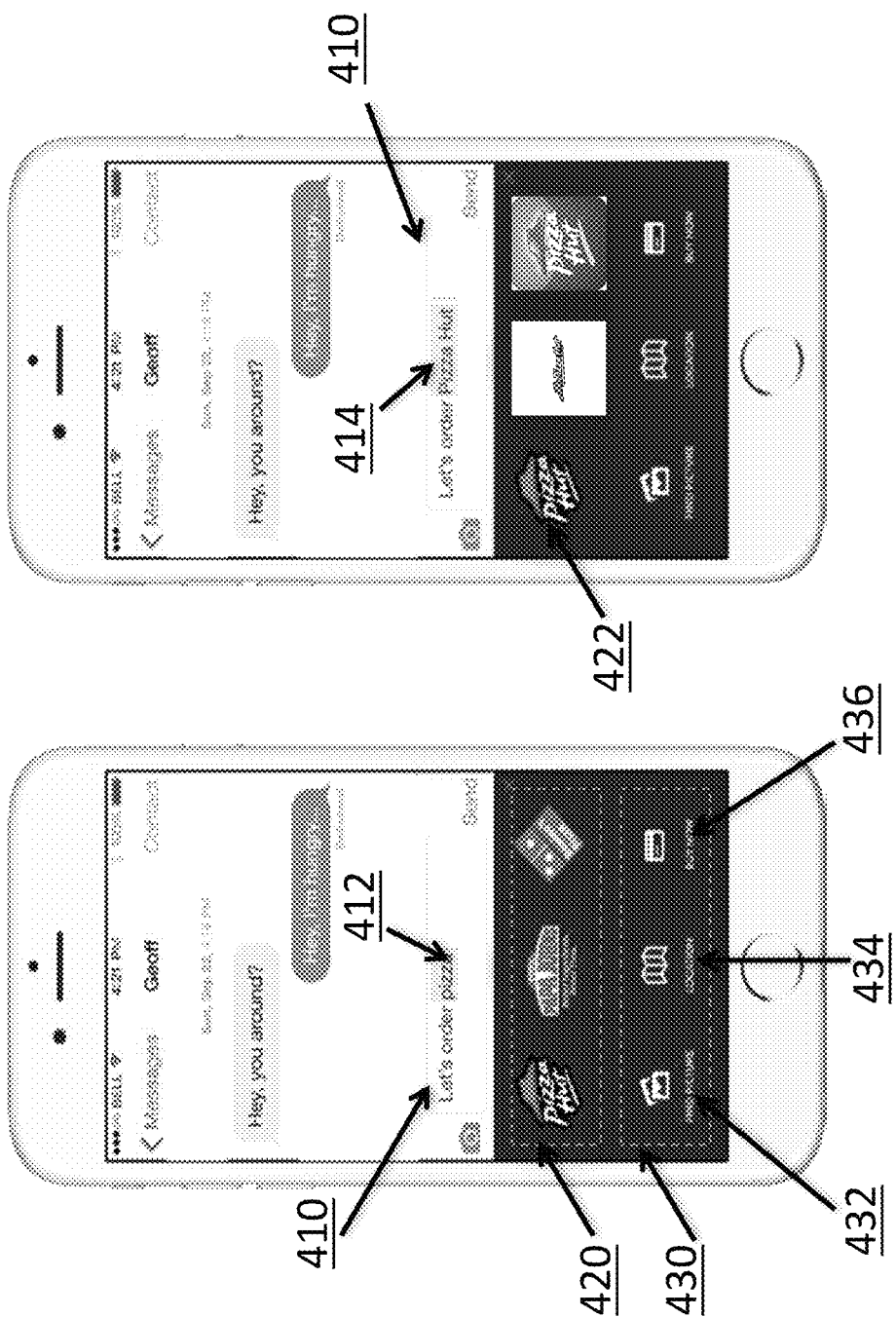

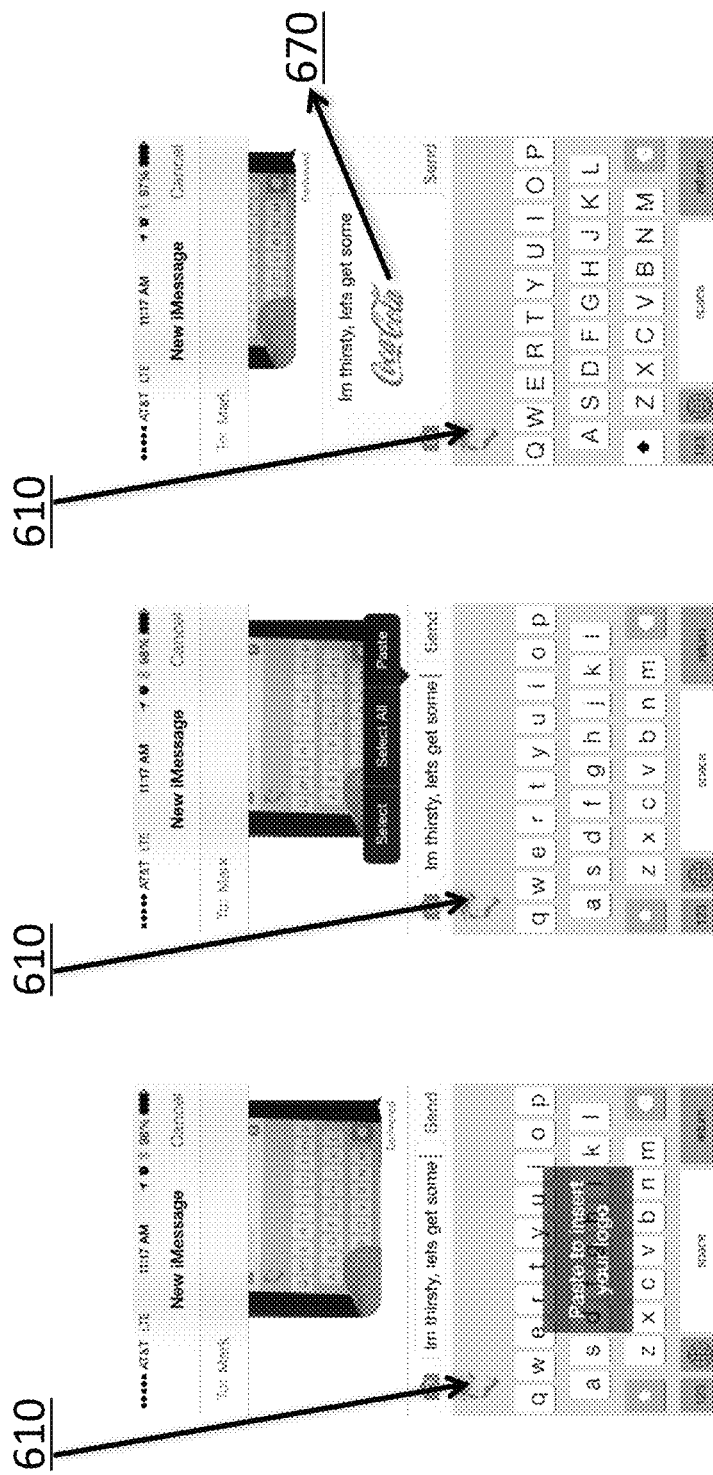

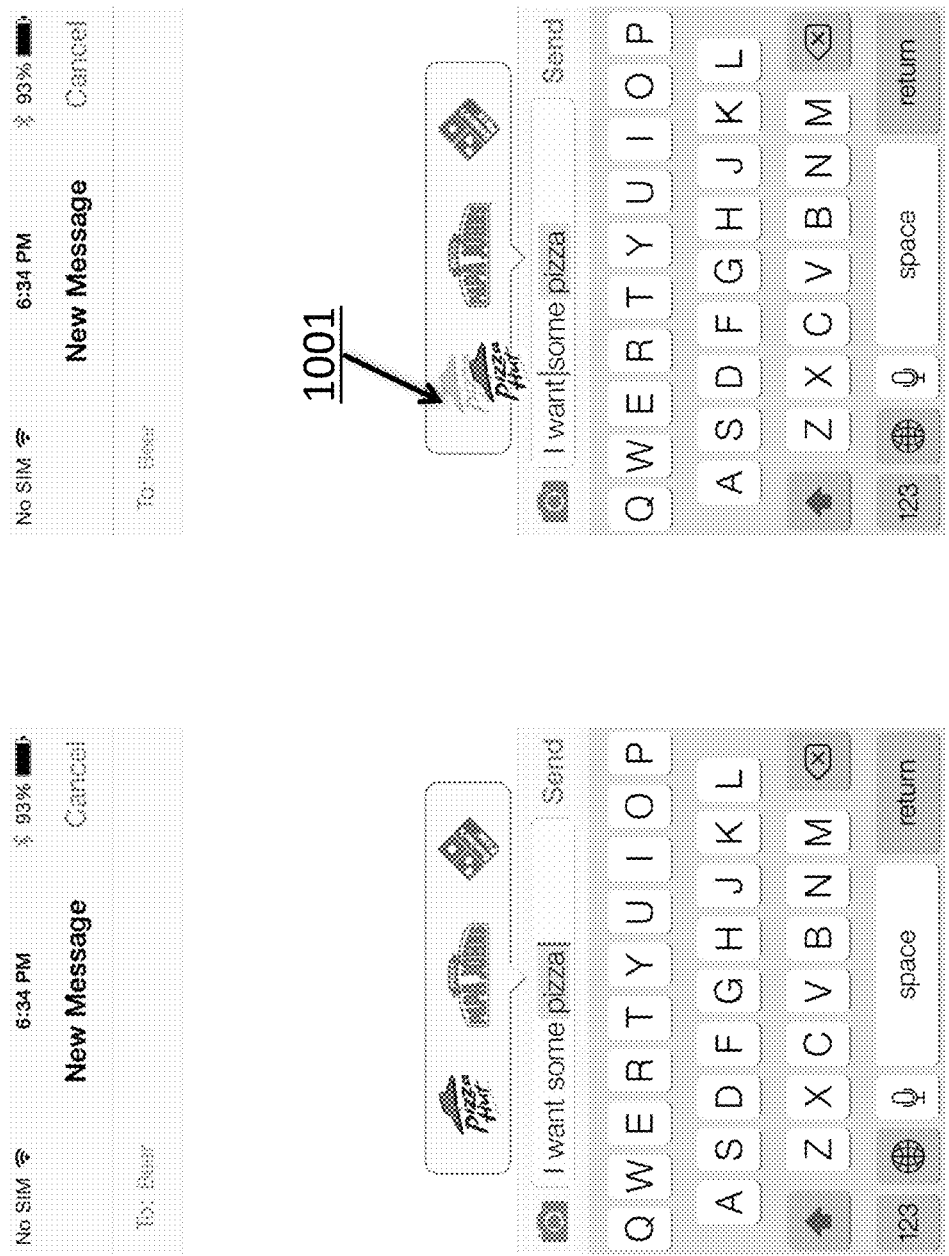

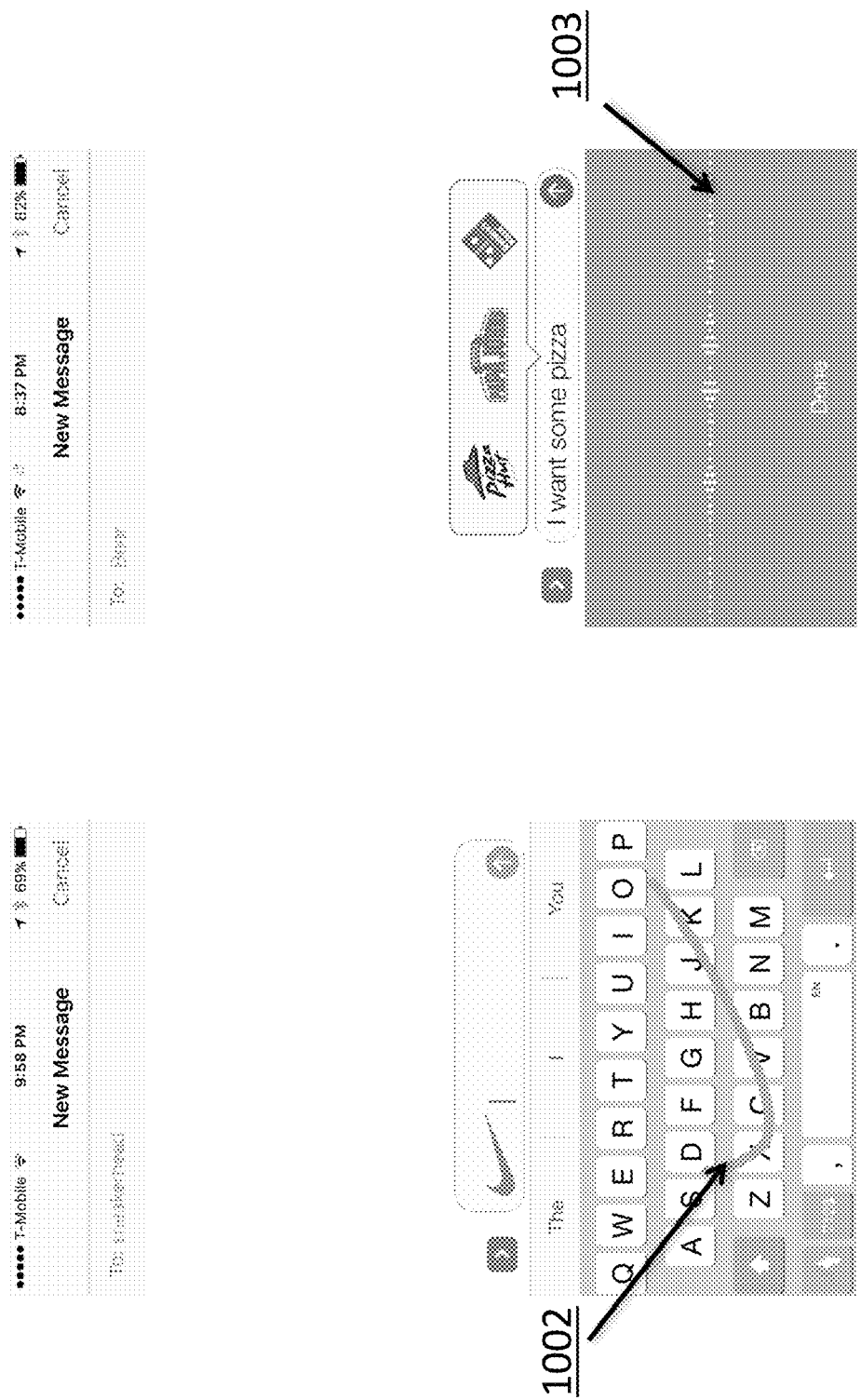

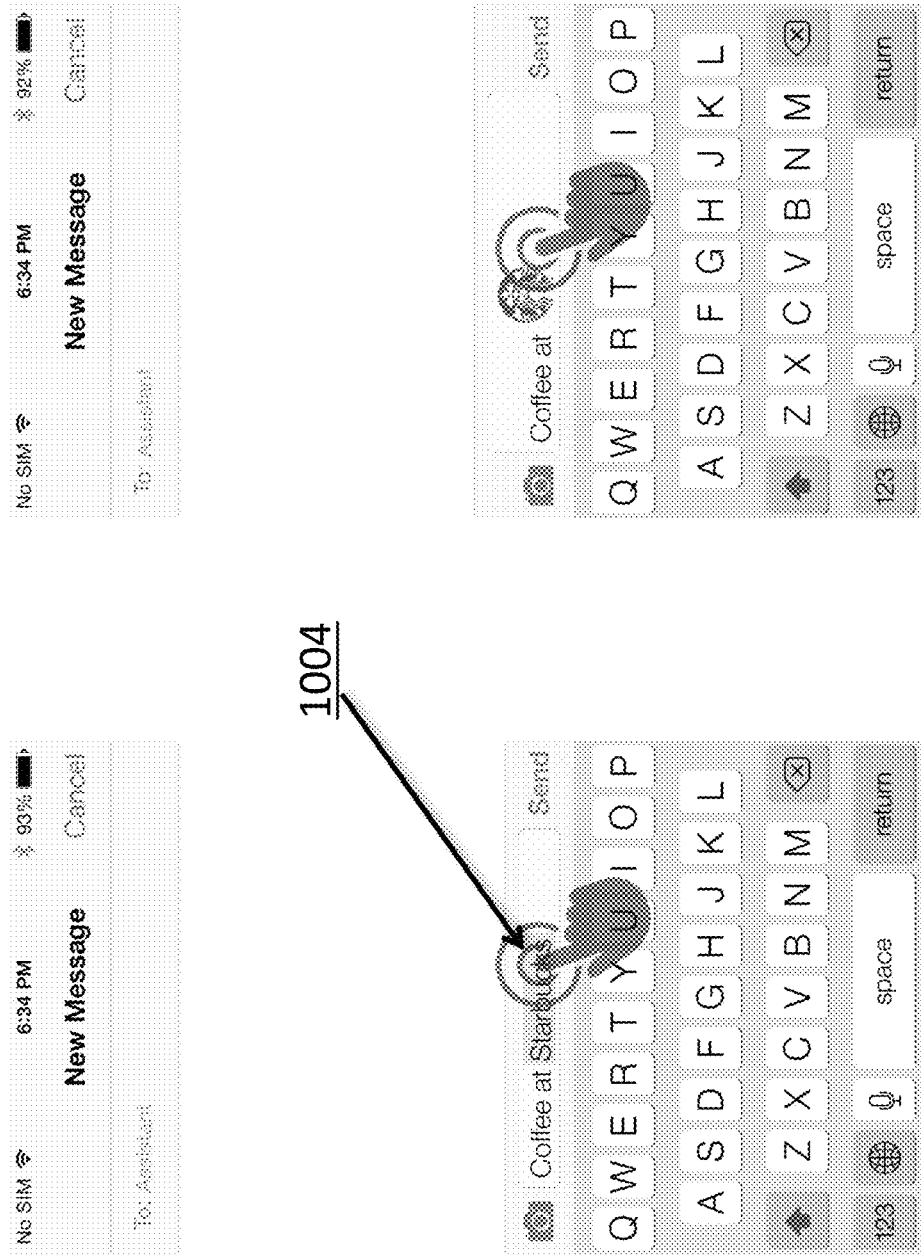

 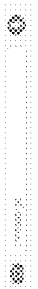
Figure 12j_2
Figure 12j_4
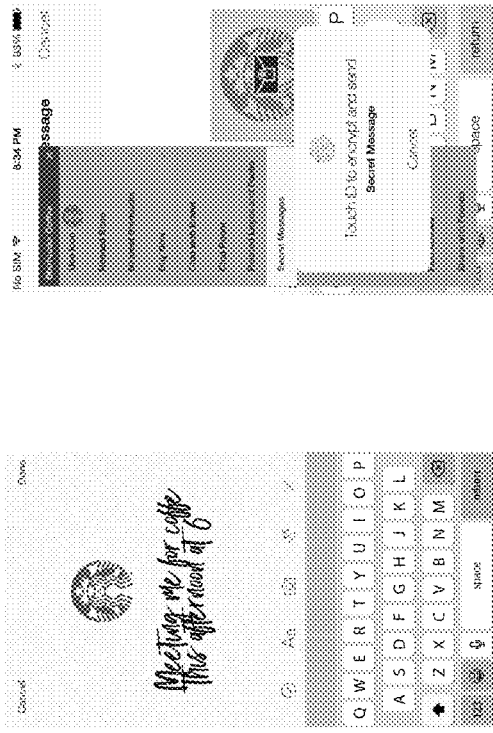 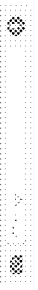
Figure 12j_1
Figure 12j_3
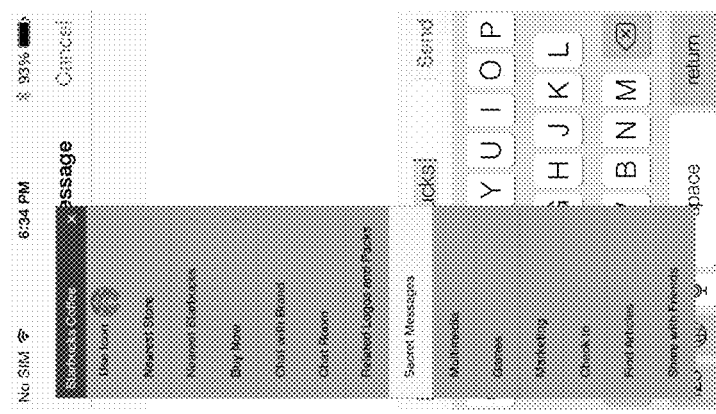
Figure 12i

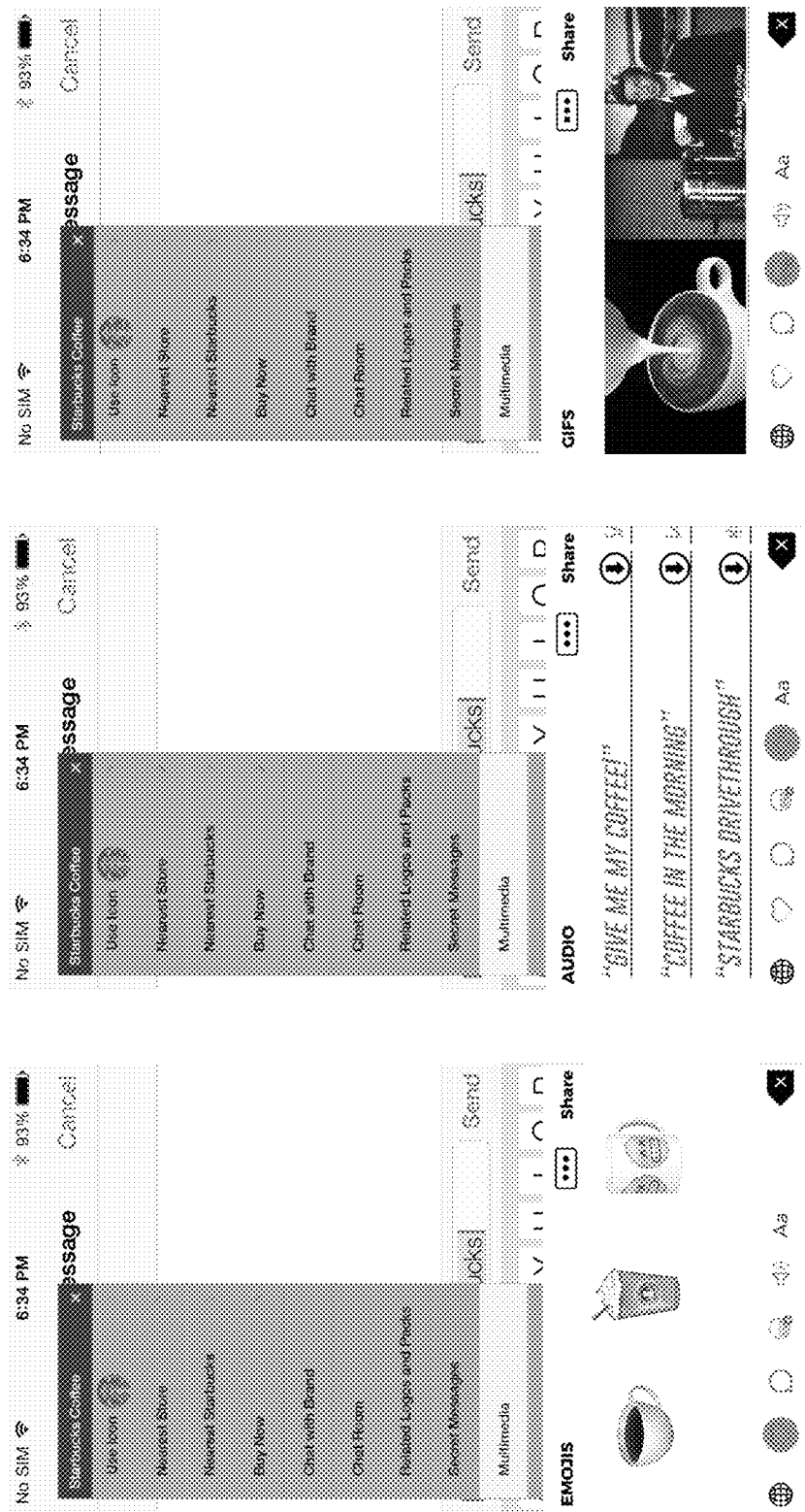

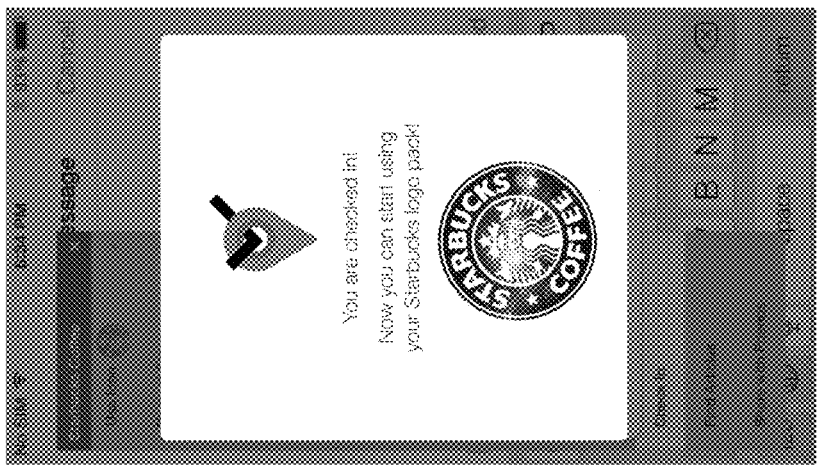
Figure 12r_2
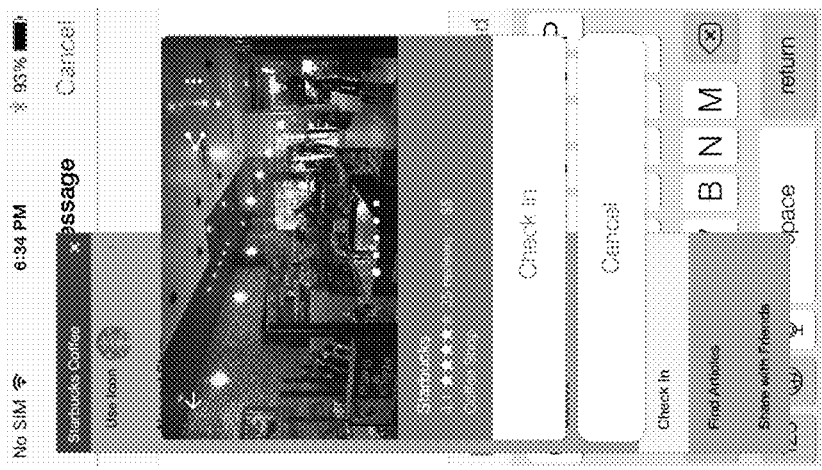
Figure 12r_1
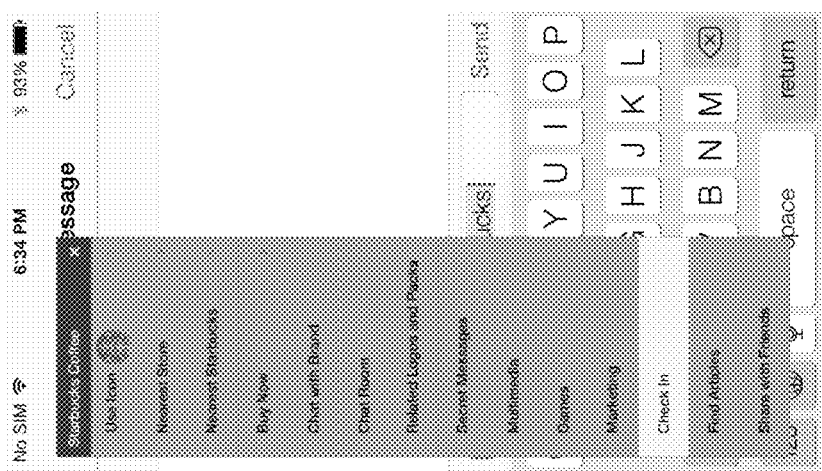
Figure 12q

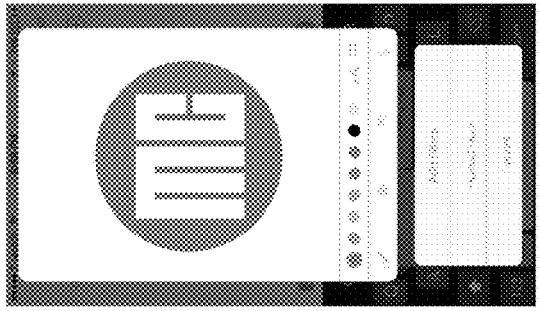
Figure 14b_2
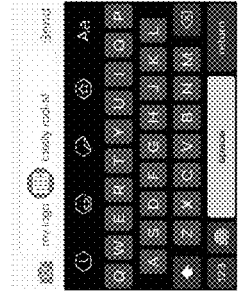
Figure 14b_4
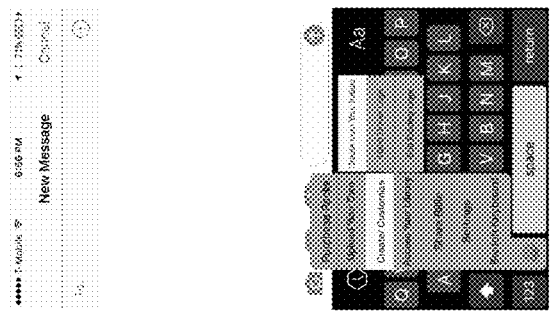
Figure 14b_1
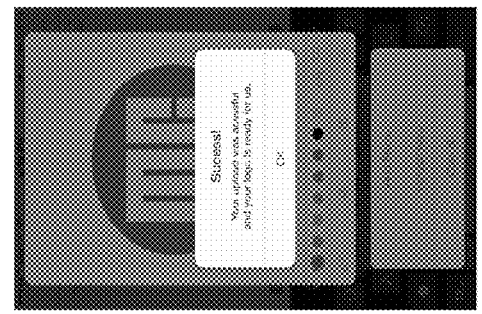
Figure 14b_3
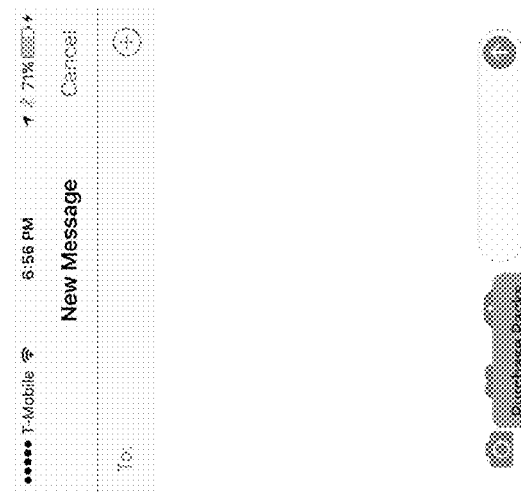
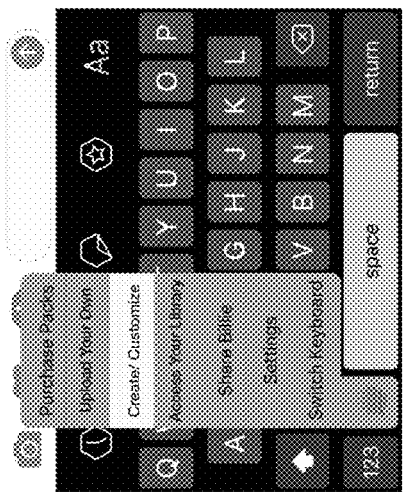
Figure 14a

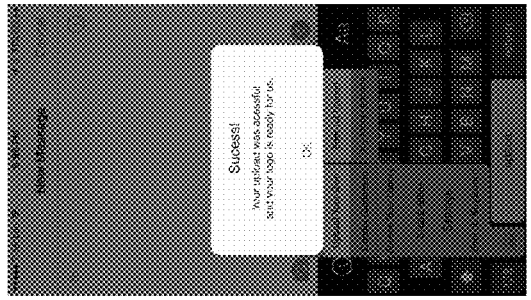
Figure 15b_2
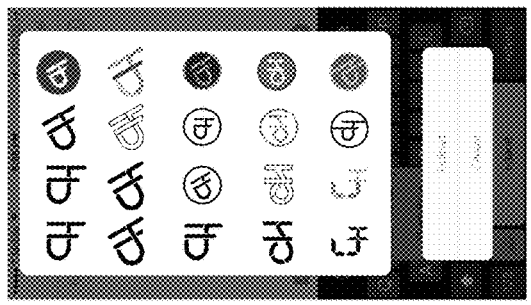
Figure 15b_1
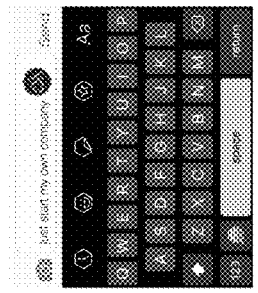
Figure 15b_3
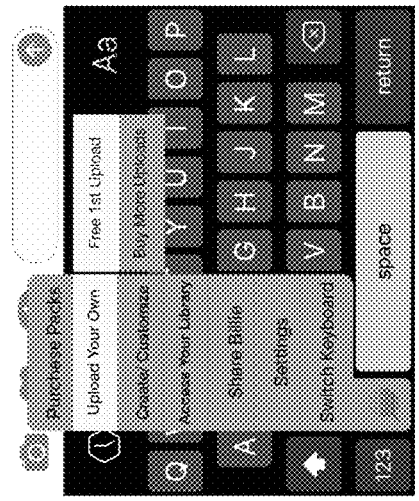
Figure 15a

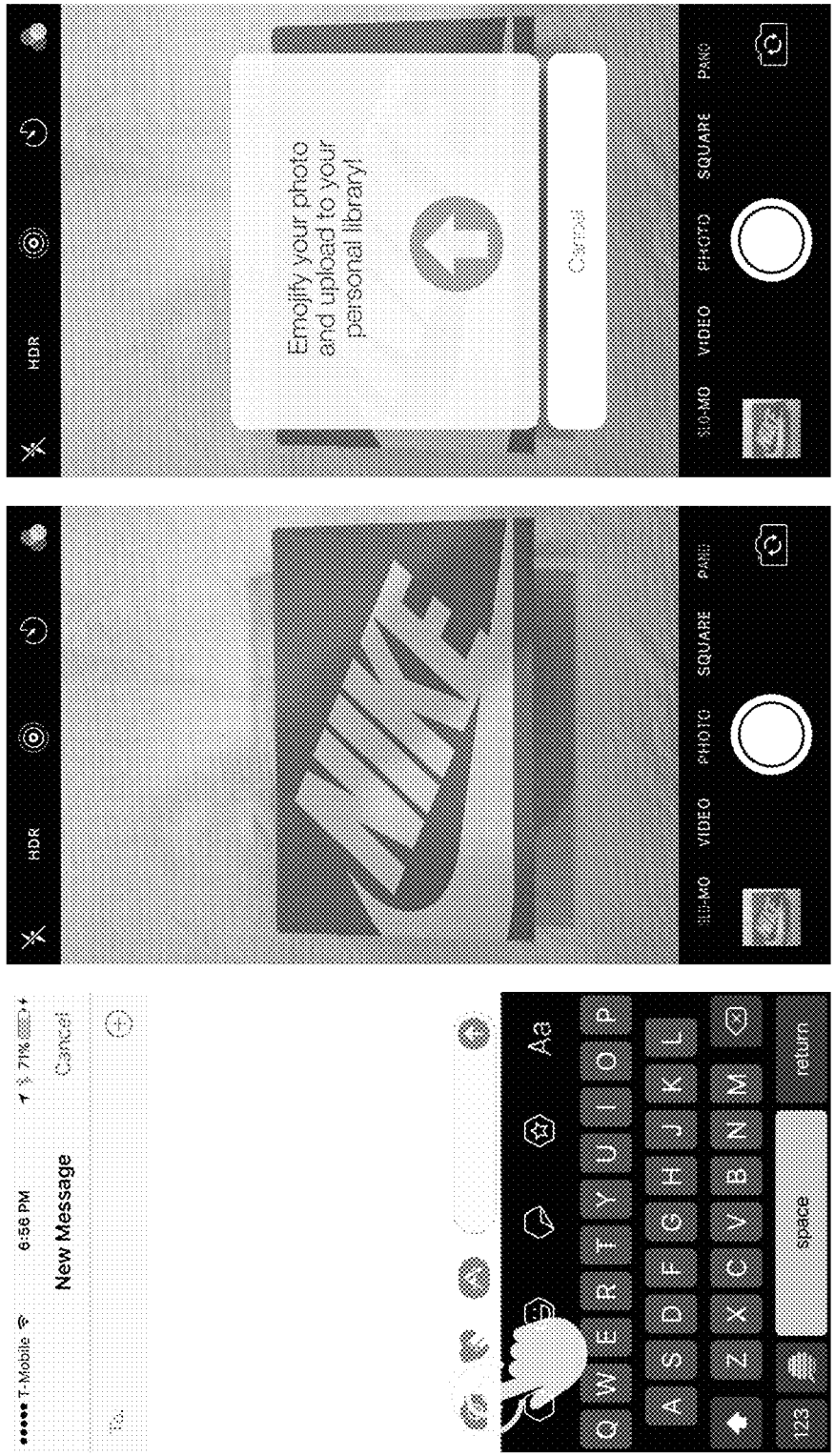

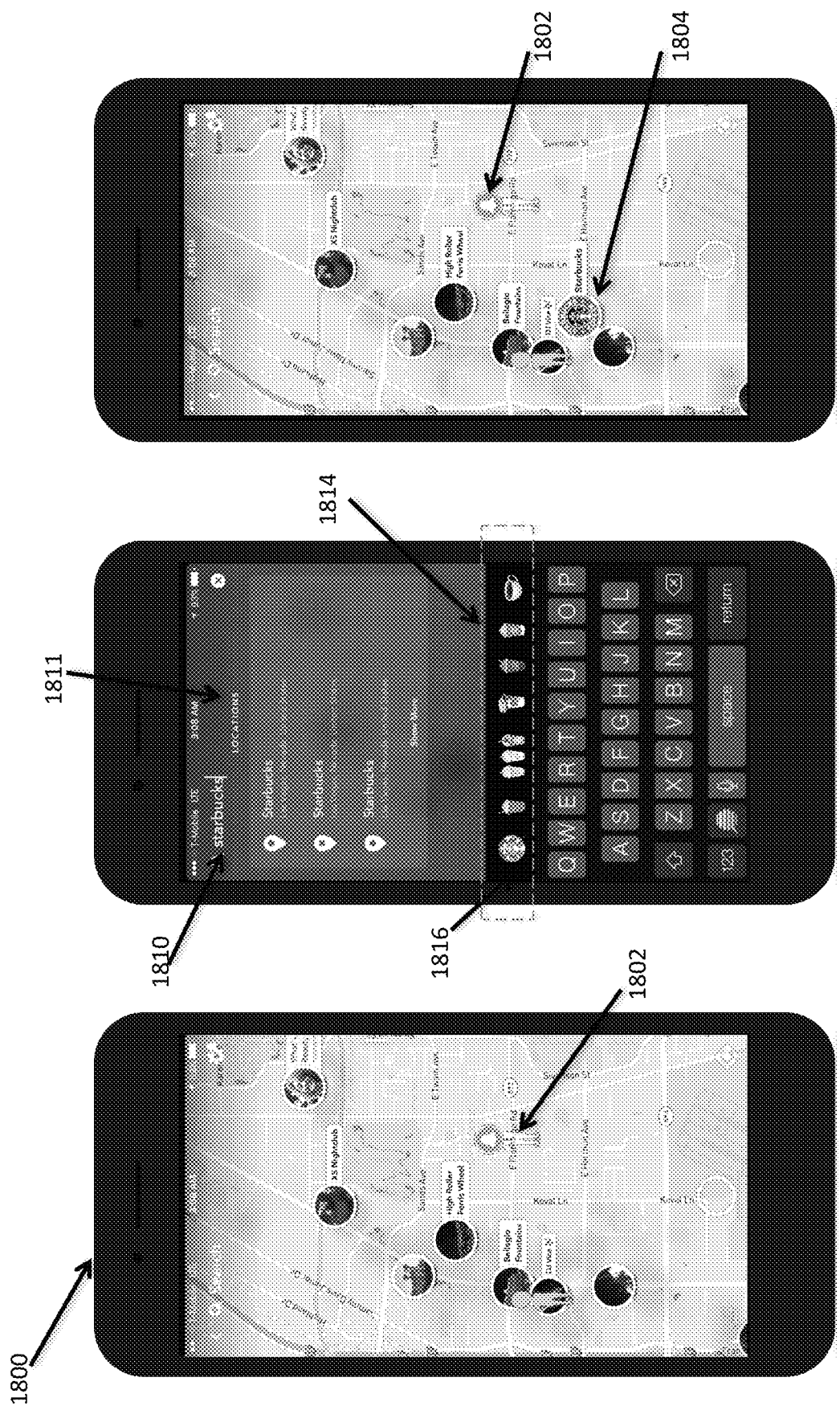

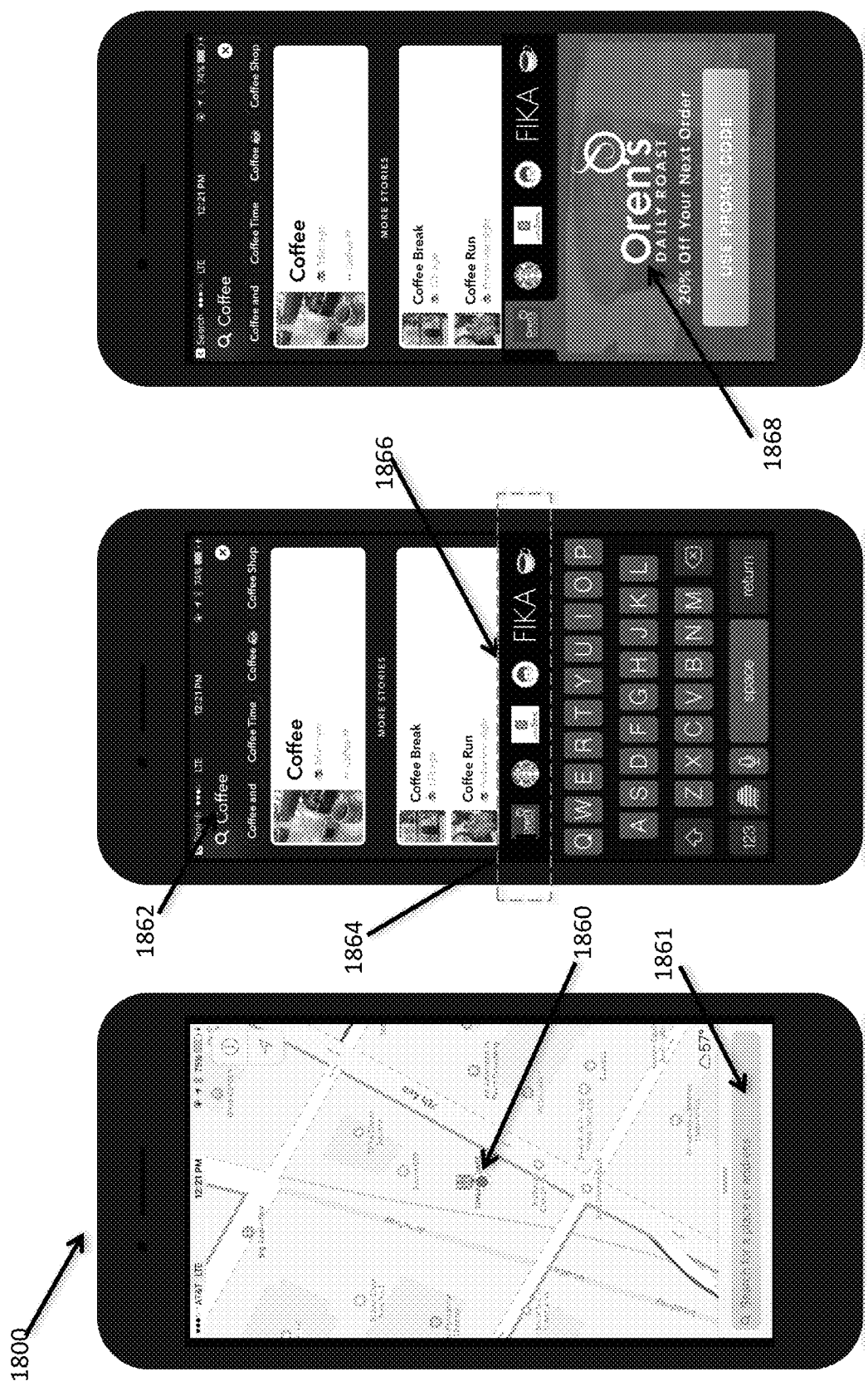

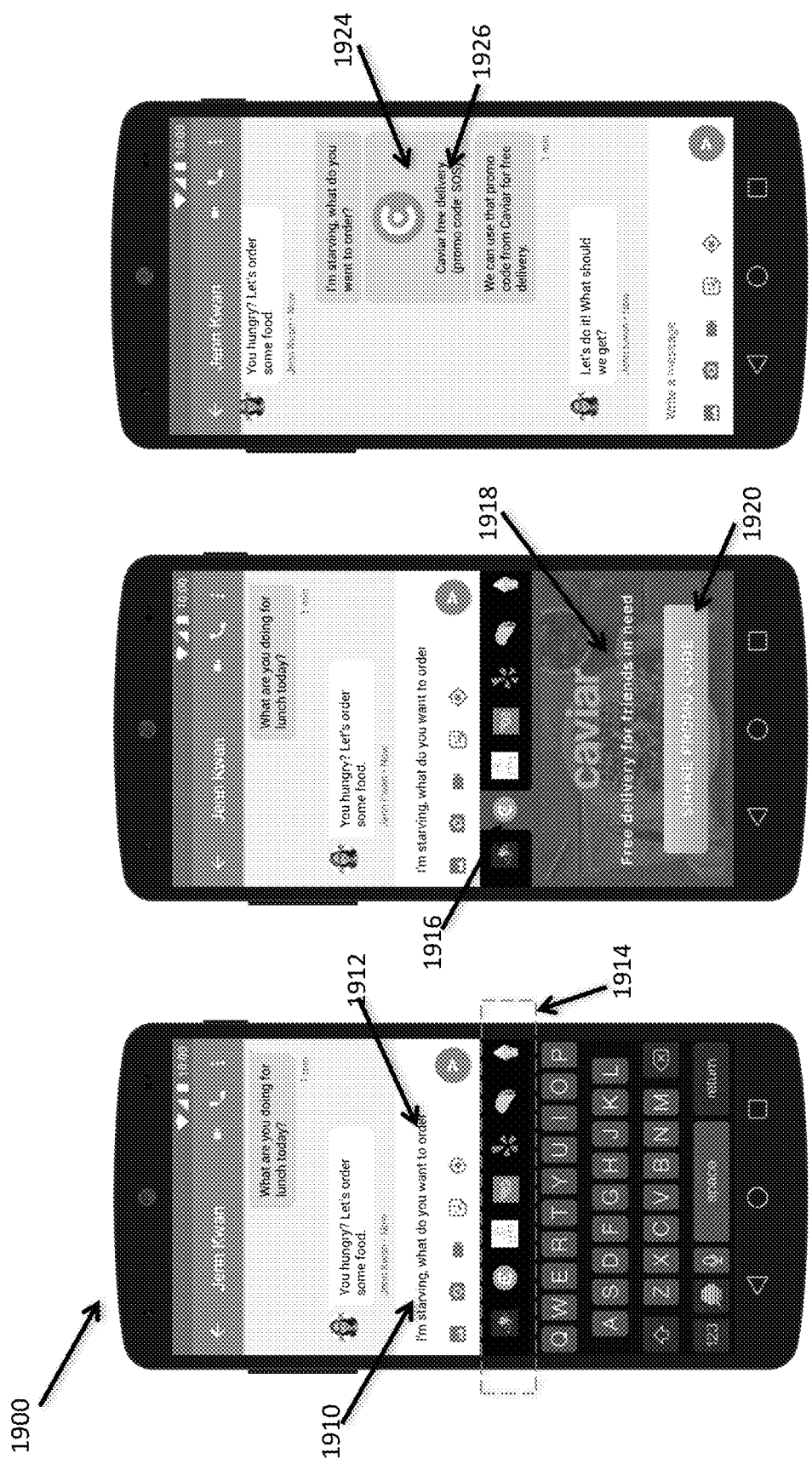

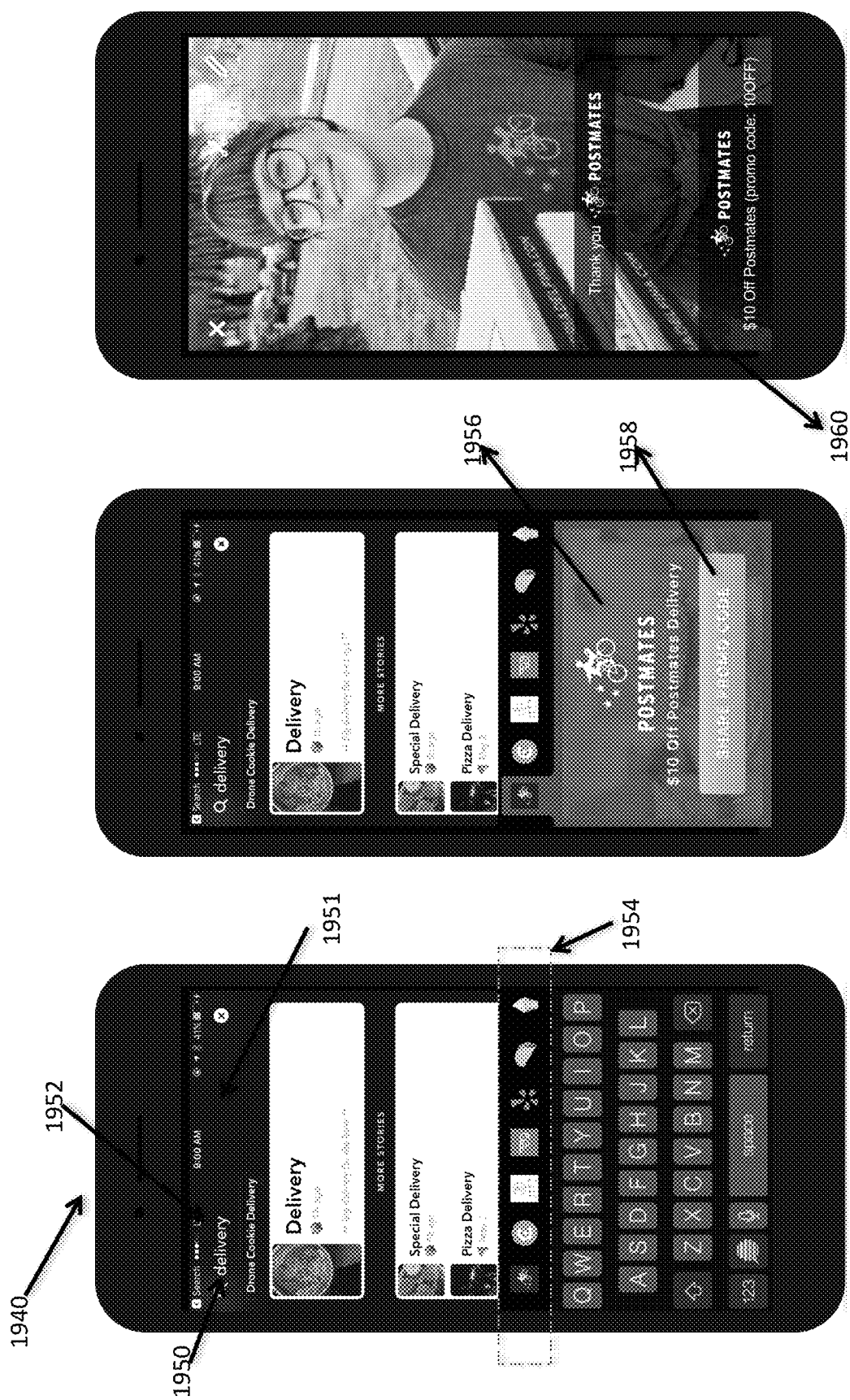

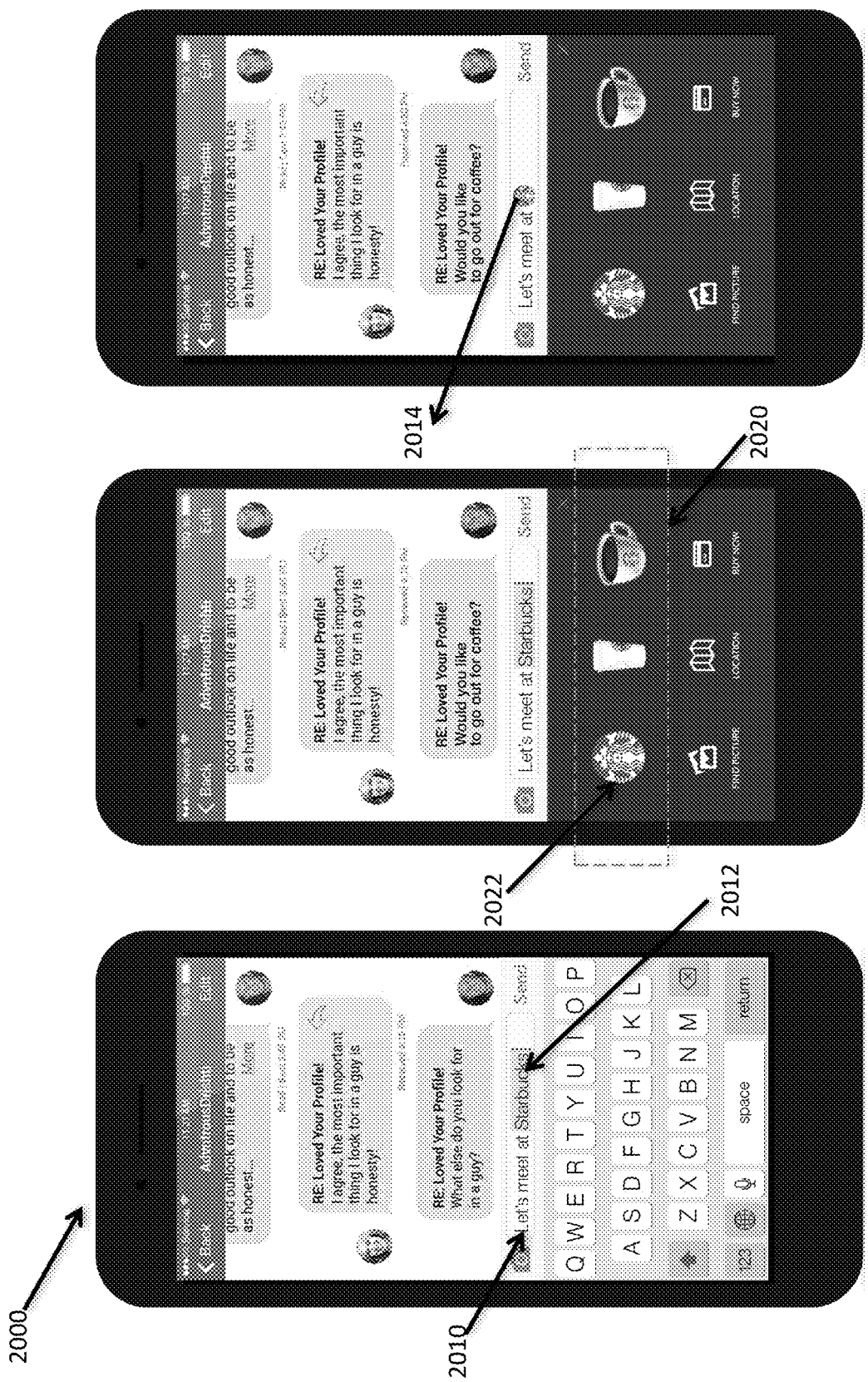

CONVERSION AND DISPLAY OF A USER INPUT

CROSS REFERENCE TO RELATED APPLICATION

This application is a continuation-in-part application of the U.S. patent application Ser. No. 15/293,161, filed on Oct. 13, 2016, entitled "Conversion and Display of a User Input," which is hereby incorporated by reference in its entirety.

FIELD OF THE INVENTION

The present invention relates generally to enhancing digital marketing in mobile devices, and more particularly, to methods and systems automatically converting a user input into a corresponding branded icon, logo or image and displaying the same in mobile communication applications.

BACKGROUND

With the popular use of mobile devices (e.g., smart phones, cell phones, tablets, etc.), today's digital environment has profoundly changed: more and more people use mobile devices rather than web-based computers to quickly search, retrieve, view and share information with their friends and contacts in a global scale. Particularly, the proliferation of various mobile communication applications, such as SMS/Text, MMS, Instant Messaging (IM), iMessage, Blackberry Message, Samsung ChatOn, Facebook Message, Twitter, WhatsApp, Skype, WeChat, and so forth, allows people to contact and communicate with their friends and contacts at any time and from anywhere. When people text each other using any of these applications, it is customary practice to shorten certain words and/or use emotional icons or images in their messages. In fact, most of these applications provide built-in "emoticons" for users to choose and insert in their text messages, although the available "emoticons" might be limited depending on specific configurations of these applications.

In view of the ever-changing digital environment, many companies have increasingly adopted mobile devices and applications installed therein as another marketing and advertising platform, in addition to conventional media such as newspaper, billboards, TV, radio, online search engine (e.g., Google) and websites accessible through computers linked to the Internet. For example, companies may specially create a mobile version of their advertisements (e.g., commercial banners) to be displayed at the edge or in the corner of a smart phone screen upon activation of certain applications in mobile devices. However, unlike conventional media such as newspaper, billboards, TV and web pages, most mobile devices, such as iPhone and Android phones, have very limited display space for displaying advertisements. As a result, oftentimes people find those advertisements distractive and even offensive for blocking or interfering with their viewing of digital contents in mobile devices.

Therefore, a need exists for advertising and marketing companies' brands, products and services in the mobile platform in an easy, effective and non-intrusive manner. On the other hand, there is conceivable benefit for mobile device users if company logos can be used, displayed or otherwise incorporated seamlessly in mobile communication applications, similar to "emoticons," for immediate visual attention.

SUMMARY OF THE INVENTION

The presently disclosed embodiments are directed to solving issues relating to one or more of the problems presented in the prior art, as well as providing additional features that will become readily apparent by reference to the following detailed description when taken in conjunction with the accompanying drawings.

One embodiment is directed to a method for converting and displaying a user input in a mobile device, comprising: receiving a user input in a mobile communication application, said user input comprising a text entry of one or more keywords; displaying one or more pre-defined image entries corresponding to at least one of the keywords in the user input, each image entry comprising a branded icon or logo; receiving a user selection of said at least one of said pre-defined image entries from the displayed image entries; and in response to said user selection, performing one or more actions associated with said at least one of said pre-defined image entries from the displayed image entries.

Another embodiment is directed to a non-transitory computer readable medium comprising executable instructions, the executable instructions, while executed, causing a processor to perform the steps of receiving a user input in a mobile communication application, said user input comprising a text entry of one or more keywords; displaying one or more pre-defined image entries corresponding to at least one of the keywords in the user input, each image entry comprising a branded icon or logo; receiving a user selection of said at least one of said pre-defined image entries from the displayed image entries; and in response to said user selection, performing one or more actions associated with said at least one of said pre-defined image entries from the displayed image entries.

Further features and advantages of the present disclosure, as well as the structure and operation of various embodiments of the present disclosure, are described in detail below with reference to the accompanying drawings.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIGS. 3a-f illustrate exemplary screen shots of a mobile application for converting a user input into a corresponding branded icon, logo or image according to embodiments of the invention;

FIGS. 4a-b illustrate exemplary screen shots of additional features of the mobile application in FIGS. 3a-f according to embodiments of the invention;

FIGS. 6a-g illustrate exemplary screen shots of additional features of the mobile application in FIGS. 3a-f according to embodiments of the invention;

FIGS. 10a-l illustrate exemplary screen shots of additional features of the mobile application in FIGS. 3a-f according to embodiments of the invention;

FIG. 13 and FIGS. 14a, 14b_1, 14b_2, 14b_3, 14b_4, 15a, 15b_1, 15b_2, 15b_3, 16a-c, 17a-b illustrate exemplary screen shots of additional features of the mobile application in FIGS. 3a-f according to embodiments of the invention;

FIGS. 18a-f illustrate exemplary screenshots of the inventive application implemented in connection with mobile mapping and location applications according to embodiments of the invention;

FIGS. 19a-f illustrate exemplary screenshots of the inventive application implemented in connection with third-party promotional or on-demand service applications according to embodiments of the invention;

FIGS. 20a-c illustrate exemplary screenshots of the inventive application implemented in connection with a mobile dating application according to embodiments of the invention;

DETAILED DESCRIPTION OF EXEMPLARY EMBODIMENTS

Figure 1:
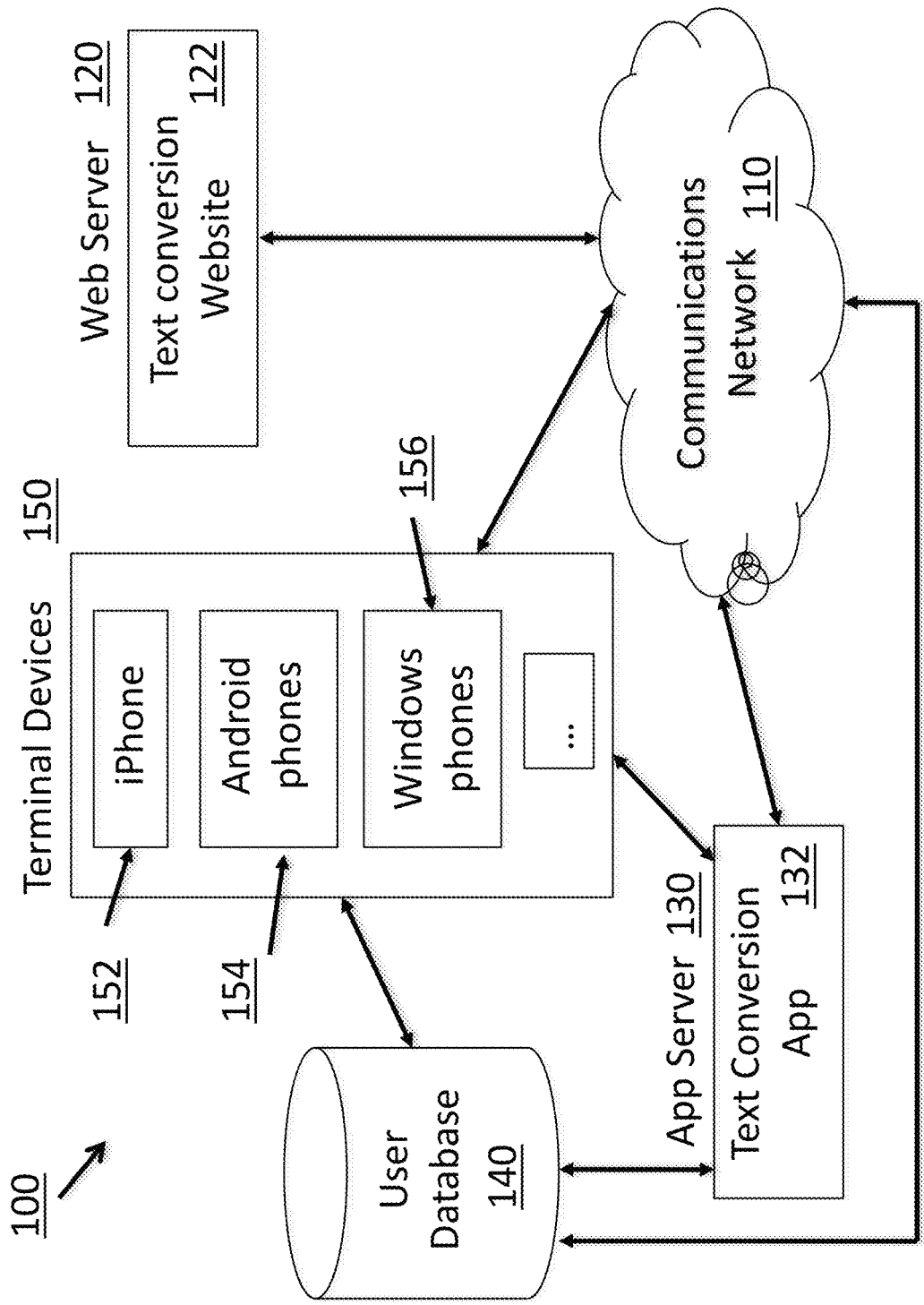
FIG. 1 is a high-level overview of an exemplary system in which embodiments of the invention can be implemented.

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, embodiments of the present invention are not intended to be limited to the examples described herein and shown, but is to be accorded the scope consistent with the claims.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Embodiments disclosed herein are directed to methods and systems allowing a company to market and advertise its brands, products and/or services in mobile platforms by use of an application converting a user input into a corresponding branded icon, logo or image and displaying the same.

Particularly, this application receives a user input in a mobile communication application, such as SMS/text, IM, iMessage, and any social networking application, for example, Facebook and Twitter, and displays one or more branded icons, logos or images corresponding to the user input for a user to select. In displaying multiple icons, logos or images corresponding to the user input, one embodiment of the application sorts the displayed icons, logos or images in a pre-defined order, for example, alphabetically according to the user input.

In one embodiment, a method for converting and displaying a user input in a mobile device comprises: receiving a user input in a mobile communication application, said user input comprising a text entry of one or more keywords; displaying one or more pre-defined image entries corresponding to at least one of the keywords in the user input, each image entry comprising a branded icon or logo; receiving a user selection of said at least one of said pre-defined image entries from the displayed image entries; and in response to said user selection, performing one or more actions associated with said at least one of said pre-defined image entries from the displayed image entries.

As partial implementation of the methods and systems, a mobile device is provided according to one embodiment of the present invention. Specifically, the processor in the device is configured to receive a user input in a mobile communication application, determine whether said user input is associated with any branded icon, logo or image, and upon the determination that said user input is associated with a particular branded icon, logo or image, display said particular branded icon, logo or image and associated menu functions in said mobile communication application.

It should be appreciated that the embodiments described herein are illustrated by referring to currently-prevalent text and messaging applications such as SMS, MMS, IM, iMessage, Samsung ChatOn, Facebook, Twitter, WhatsApp, Skype, WeChat, etc., the application of these embodiments are not so limited, but can include any type of existing or future social network platforms that people may adopt in view of the continuous evolvement of technologies.

Referring to FIG. 1, illustrated therein is a high-level overview of an exemplary system 100 in which embodiments of the invention can be implemented. As shown in FIG. 1, the system 100 comprises a communications network 110 and a few entities connected to the network, including one or more web servers 120, one or more application servers 130, a user database 140 and one or more terminal devices 150.

The communication network 110 can be one or a combination of the following networks: the Internet, Ethernet, a mobile carrier's core network (e.g., AT&T or Verizon networks), a Public Switched Telephone Network (PSTN), a Radio Access Network (RAN), and any other wired or wireless networks.

The web server 120 is configured to host a website or web-based application 122 (e.g., a text conversion website) for company users to register and enter their logo information, for example, entries correlating certain keywords with their brands, branded icons, logos or images. Preferably, the application 122 is configured to provide a website accessible over the Internet. Alternatively, it can also be embodied in a mobile form, e.g., capable of being downloaded and installed in a mobile device. All the company information, such as the company address, account, contact and payment, and all related logo data can be stored in the user database 140, as with end user data, or in separate databases that are connected to the network 110 and accessible to the web server 120.

The application server 130 is configured with computer software, executable programs, algorithms, functional modules and processes, such as the application 132 (e.g., the text conversion app) for converting a user input into corresponding branded icons, logos or images. The application 132 is configured to not only display the branded icons, logos or images corresponding to the user input, but also provide various menu functions allowing a user to select and search for brand-related information, conduct an online search for branded products and services, etc., as will be described in detail below. The application 132 can be downloaded and installed in any mobile device from a website, an App Store typical of iPhones, or any application utility provided by Android phones, Windows phones or any other mobile devices. In practice, various versions and updates of the application 132 can be provided in order to be compatible with different mobile operating systems such as Apple iOS, Android or Windows. Once the application 132 is downloaded and installed in a user's mobile device, the device is able to interact with the application server 130 in providing the function of converting words into logos.

Upon authorization of registered users of the application 132, the application server 130 is also capable of storing user information in the user database 140 and accessing the same, whenever needed, to compile user reports for company users. For example, the user information in the user database 140 can include the user's current location, search history, name, age, gender, date of birth, home address, occupation, ethnicity, phone number, email, etc. When a registered user is using the application 132 through her/his terminal device, the user data can be collected and recorded in the database 140 on a real-time basis. In an alternative embodiment, the application 132 and the application server 130 can back up user data into the database 140 on a regular basis, for example, every thirty minutes or every business day.

As illustrated in FIG. 1, terminal devices or mobile devices 150 comprise various smart phones such as iPhone 152, Android phones 154, Windows phones 156. However, the devices 150 are not so limited, but may include many other network devices, including a fixed or mobile subscriber unit, a pager, a cellular telephone, a personal digital assistant (PDA), a smart phone, a laptop, a netbook, a tablet computer, a personal computer, a wireless sensor, consumer electronic devices, and the like.

It should be appreciated that the system 100 in FIG. 1 is for illustration only and can be implemented with many variations without departing from the spirit of the invention. For instance, the web server 120 and application server 130 each can include multiple computers and stations distributed in different locations.

Figure 2:
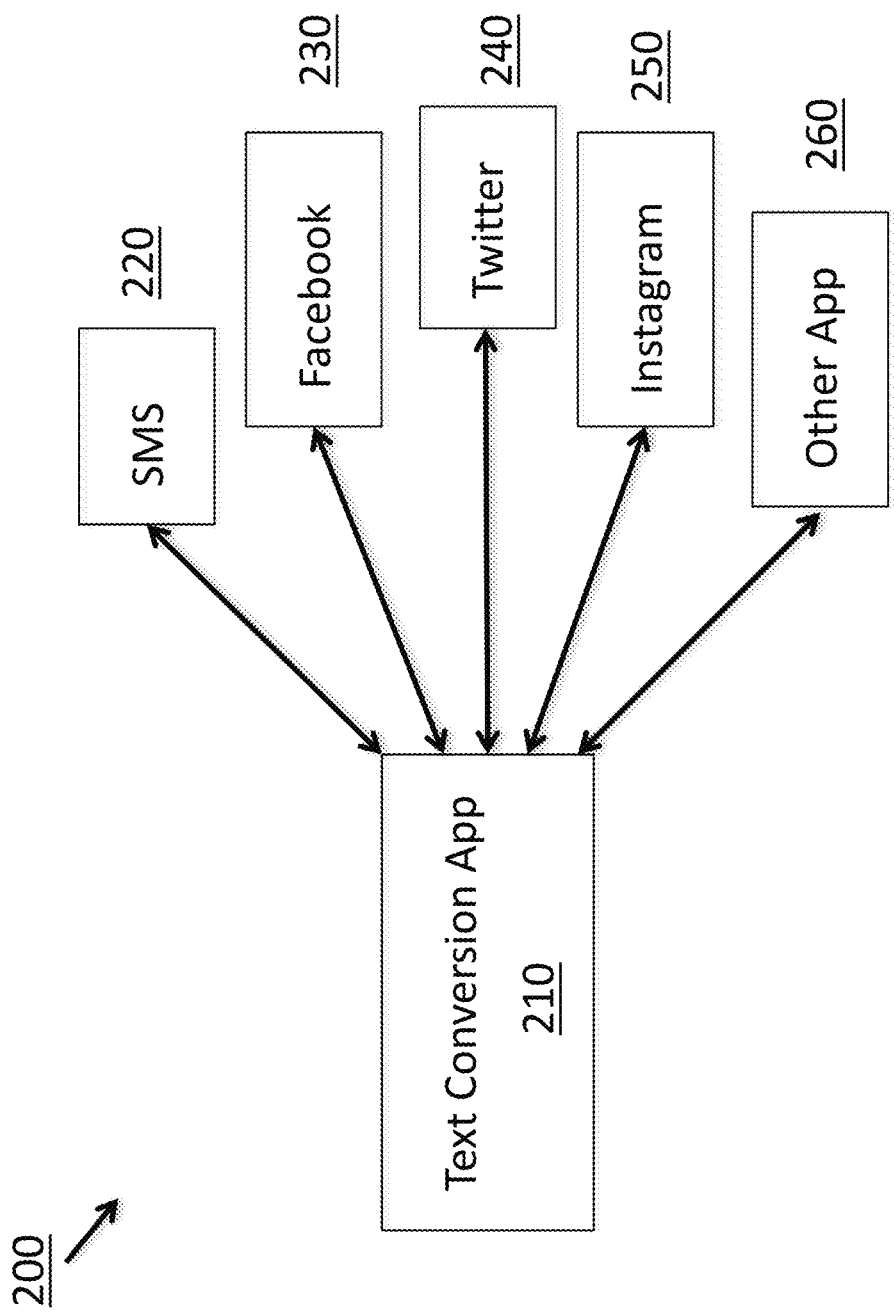
FIG. 2 illustrates exemplary web-based as well as mobile applications in which embodiments of the invention can be implemented.

FIG. 2 shows exemplary web-based as well as mobile applications in which embodiments of the invention can be implemented. For example, when the application 210 is enabled in the user's mobile device, it allows for a conversion of a user input (e.g., a text entry) into corresponding branded icons, logos or images for display in mobile communication applications including various texting/messaging applications such as SMS 220, and social networking applications such as Facebook 230, Twitter 240 and Instagram 250 and many other applications 260 capable of sending and receiving communications, for example, iMessage provided by Apple Inc. on iPhone devices. It should be understood that the applications in FIG. 2 are for illustration only, and the applicability of embodiments of the invention is not limited, but can include any application installed and ready to use in the user's mobile device.

Turning to the exemplary screenshots in FIGS. 3*a-f*, a mobile application as illustrated in FIG. 2 for converting a user input into a corresponding branded icon, logo or image will be described. As demonstrated in FIG. 3*a*, when a text entry 310 (e.g., "Absolutely, meet at Starbucks") is received, the application determines if the text entry 310 contains any keyword or pre-defined term 312 that corresponds to one or more branded icons, logos or images. This word or term 312 can be a brand name or trademark word, for example, "Starbucks" as shown in FIG. 3*a*, or a generic search word, such as "coffee," which may be pre-defined to correspond to a number of coffee brands, e.g., Starbucks, Coffee Bean & Tea Leaf, etc. Once such a keyword or pre-defined term 312 is identified, the application automatically displays one or more corresponding icons, images or logos 320, from which the user can select one to replace the word or term 312 in the text entry 310. For instance, as shown in FIG. 3*b*, if the user selects the logo image 322 to replace the term "Starbucks," the corresponding icon 314 will be displayed in the text entry 310.

Back to FIG. 3*a*, in addition to displaying one or more branded icons, images or logos 320 corresponding to the user input, the application also provides various menu functions 330 associated with the displayed brand, such as a menu function 332 "Find Picture" for finding related logo pictures, a menu function 334 "Location" for navigating or locating a brand store in the map, a menu function 336 "Buy Now" for purchasing branded products and/or services, and many other possible functions (not shown).

As shown in FIG. 3*c*, if a user clicks or touches on the menu function 332 "Find Picture," the application will display product pictures of the "Starbucks" brand so that the user can further select for a display in the text entry 310. Or if the user selects (by clicking or touching on) the menu function 334 "Location" as illustrated in FIG. 3*d*, the application will display a store location for "Starbucks" in the map 350. For example, the application may allow the user to "Find the nearest Starbucks" or to "Find the nearest coffee shop." Furthermore, the user can use the "send the location" function 360 in FIG. 3*e*. As a result of doing so, the user can send a location message 370, as illustrated in FIG. 3*f*.

It should be appreciated that FIGS. 3*a-f* are for illustration only, and many variations can be implemented as to how to display the branded icons, logos and images for the user selection. In addition, many other features and functionalities can be implemented according to alternative embodiments of the invention. For example, in one embodiment, the user input received by the application may be in the form of a voice or speech demand, and without converting the voice/speech input into texts or words, the application can directly convert it into one or more corresponding branded icons, logos or images for display. In another embodiment, the displayed icons, logos or images (e.g., all the Starbucks logos 320 in FIGS. 3*a-b*) can comprise not only 2D images, but also 3D animations, audio and video clips, and many other multi-media forms. Also, the menu functions of the application are not limited to the demonstrations in FIGS. 3*a-f*, and can include many more customized services, such as directing the user to the original website of the brand for further browsing and shopping, allowing the user to transfer money or perform online banking, recommending related products and services, and so forth.

FIGS. 4*a-b* illustrate some additional features of the above-described mobile application according to various embodiments of the invention. As shown in FIG. 4*a*, when the user types a generic word 412, e.g., "Pizza," in the text entry 410 "Let's order Pizza," the application intelligently detects the word 412 and determines this word is associated with a number of pizza company brands. As such, the application displays the logos, icons and images of all related pizza brands 420, for example, "Pizza Hut," "Papa Johns" and "Dominos," for the user to choose. In one embodiment, the logos, icons or branded images are displayed in a paid-for advertising order, analogous to the search results via Google AdWord. Similar to the functions in FIGS. 3*a-f*, the application also displays a number of menu functions 430, such as "Find Picture" 432, "Location" 434 and "Buy Now" 436. However, rather than choose a displayed icon or logo, the user may continue to type and finish the word "Pizza Hut" 414, as demonstrated in FIG. 4*b*. In this case, upon detection of the word change, the application automatically eliminates other company icons, logos or brand images and only displays those corresponding to the brand "Pizza Hut." Then the user can select a particular logo image, for example, the logo 422, to replace the word entry 414.

Figure 5:
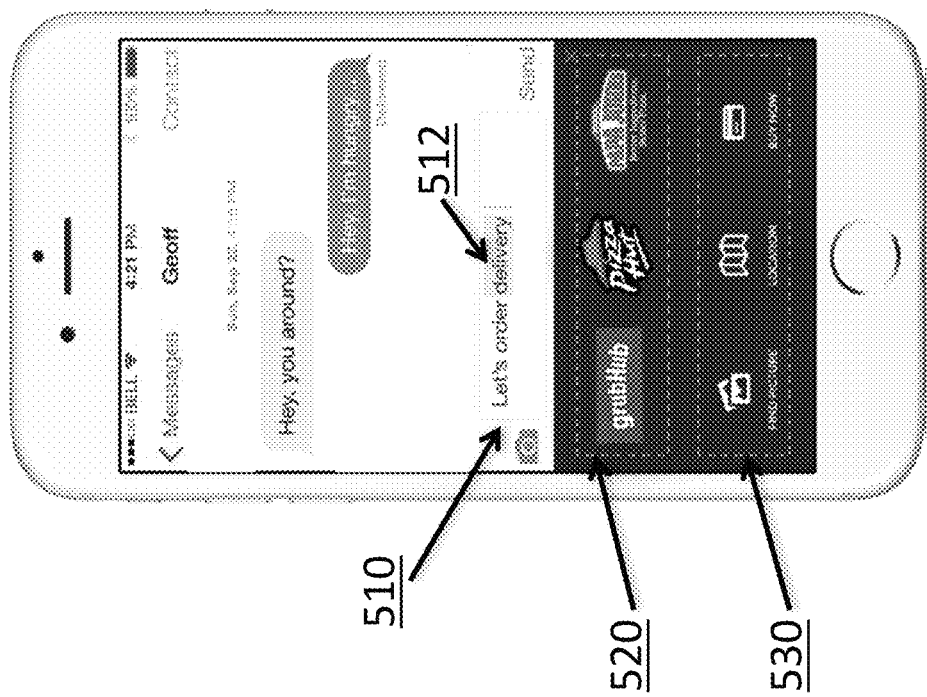
FIG. 5 is an exemplary screen shot of additional features of the mobile application in FIGS. 3a-f according to embodiments of the invention.

FIG. 5 demonstrates another feature of the above-described mobile application according to embodiments of the invention. As shown in FIG. 5, the application receives a text entry 510 ("Let's order delivery") that contains a pre-defined word or term 512 "delivery." Once the application determines that this term "delivery," as predefined by company users, is associated with multiple branded icons, logos or images, these icons, logos or images 520 will be displayed for the user to choose. Additionally, associated menu functions 530 will also be displayed.

Figures 6A, 6B, 6C, 6D:
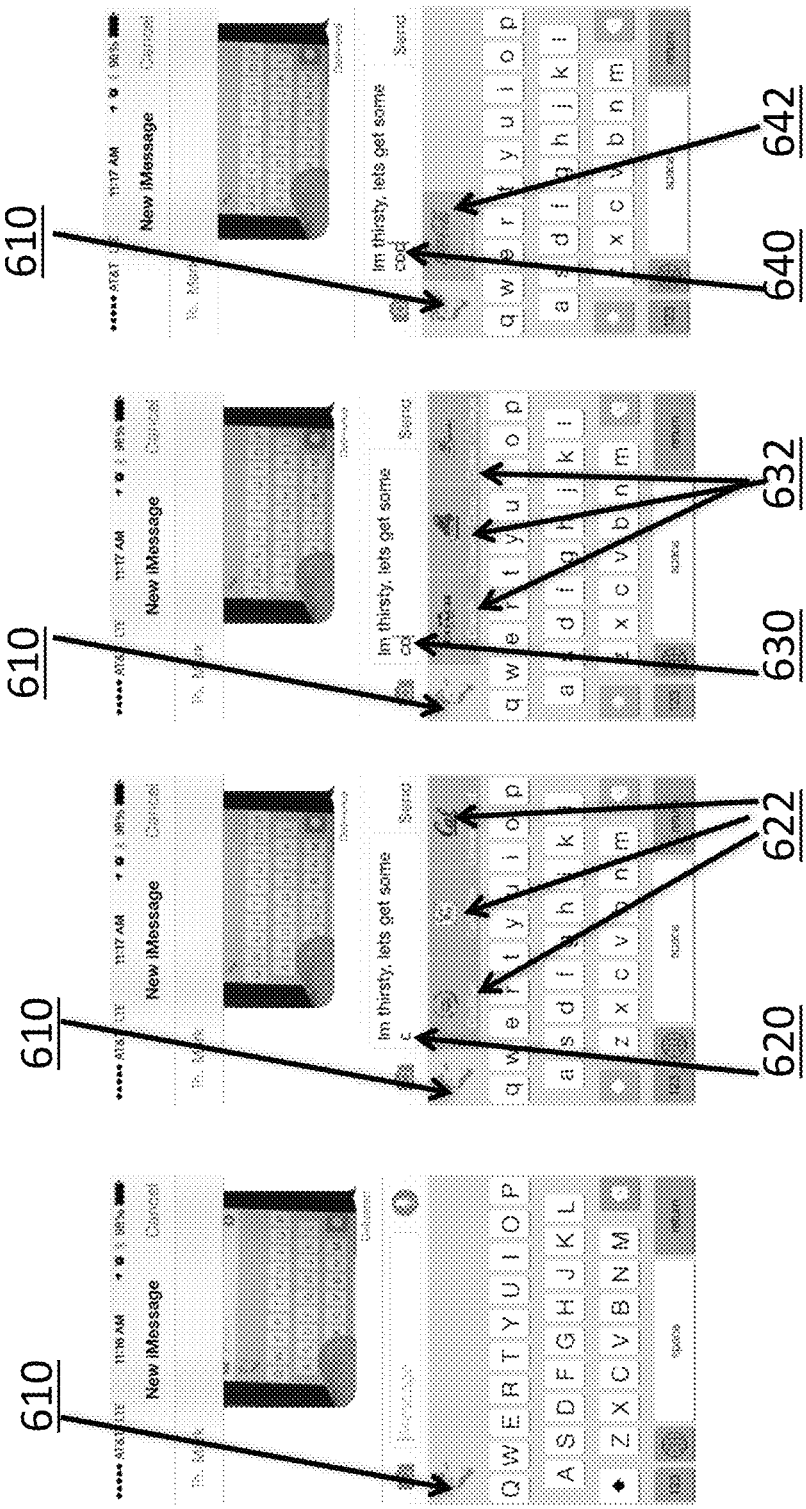

Another unique and user-friendly feature of the above-described mobile application will be described with reference to the exemplary screenshots in FIGS. 6*a-g*. As shown in FIG. 6*a*, when the application is activated, for example, as indicated by the icon 610 on the key bar, a user can type any word in the text entry box. If the user types a letter "c" 620 as shown in FIG. 6*b*, all the icon or logo images 622 corresponding to words containing "c" will appear on the key bar and in an alphabetical order. The key bar can be scrolled from left to right to present more logo images. If the user keeps typing the letter "o" and the word now becomes "co" 630, as shown in FIG. 6*c*, only the icon or logo images 632 that correspond to the words containing "co" will remain on the key bar alphabetically. Similarly, as shown in FIG. 6*d*, when the user continues to type and the word becomes "coc" 640, then the application will filter out more images to only leave the image corresponding to words containing "coc," for example, the "Coca-Cola" logo image 642. At this time, one embodiment of the application allows the user to select the image 642 by tapping on it, and once the image is tapped, the word "coc" may be deleted from the text entry, and as shown in FIG. 6*e*, the application presents an alert message for the user to paste the selected or tapped image into the text. In FIG. 6*f*, the user can use existing keyboard functions like "select" and "paste" to insert the logo image. As a result, the logo image 670 is inserted in the text entry as shown in FIG. 6*g*.

It should be appreciated that FIGS. 6*a-g* are for illustration only, and many variations can be implemented as to how to display the branded icons, logos and images for the user selection. In addition, many other features and functionalities can be implemented according to alternative embodiments of the invention. For example, the user may select an icon or logo image through other actions rather than tapping or pressing the image.

In one embodiment, the icon or logo image is associated with a sound file so that when the user selects the image (e.g., by tapping or pressing the image), the sound file will be played. As an example, the "Coca-Cola" image can be associated with a sound file that plays a brand slogan such as "share a coke." So when the user presses or taps on the "Coca-Cola" image, the sound "share a coke" will be played. Also, after the user sends the text message with an icon or logo image inserted therein, the message recipient can use the inserted image in a similar manner, for example, by cutting and pasting the inserted image in his own text entry, or pressing the inserted image to play the sound file.

Another embodiment of the present invention relates to stenographic message encryption. In this embodiment, the user can enable a particular operating mode, for example, so-called "undercover mode" in which the user writes and sends an image message to a recipient. Then the recipient, upon receiving the image message, can also enable the "undercover mode" to read the text message embedded in the image. In one configuration, the "undercover mode" can be activated or verified through a user touch ID. The images with embedded text messages are pre-created or generic. Or users can create their own images with text messages embedded in them.

Figure 7:
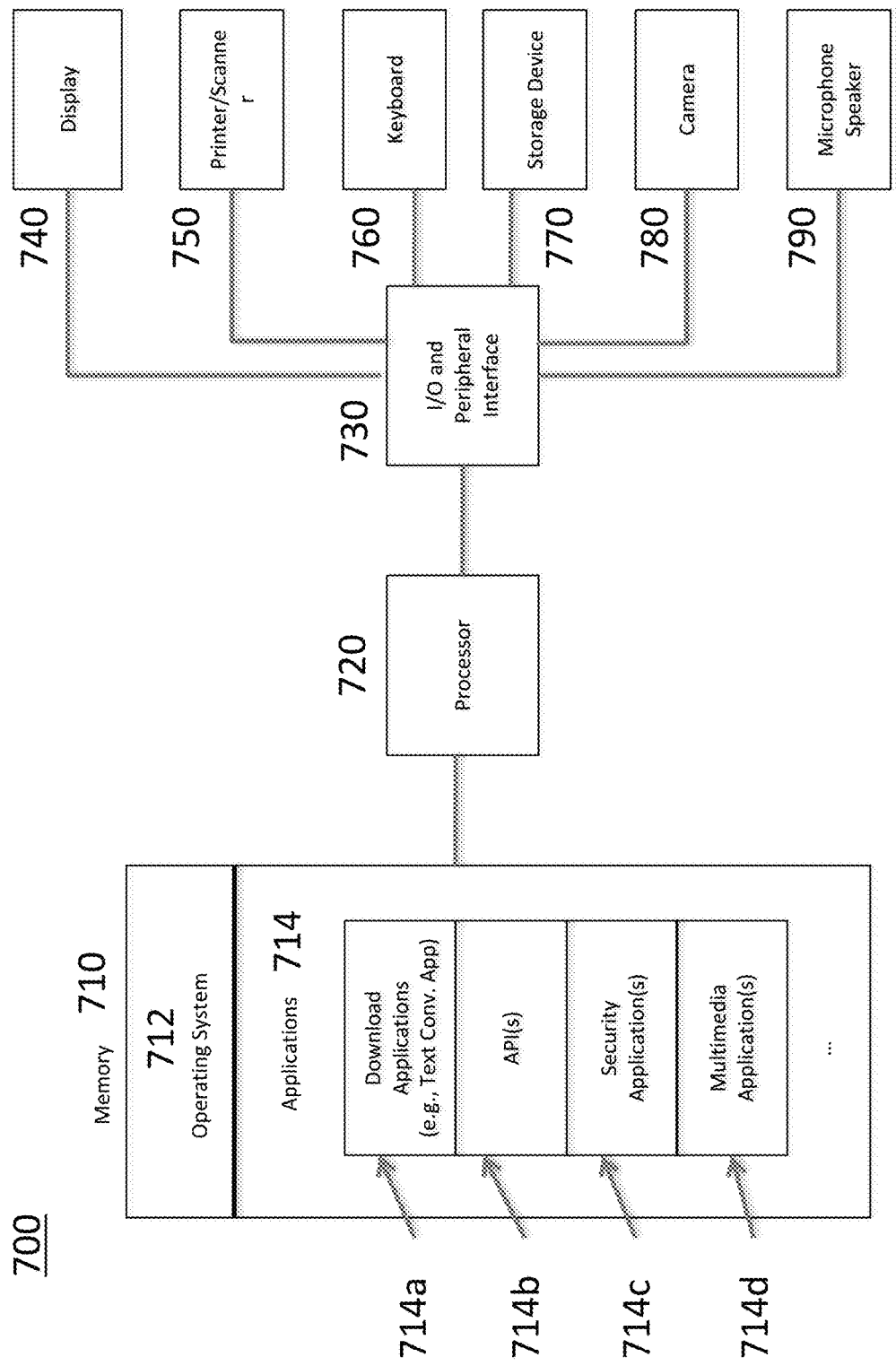
FIG. 7 is a simplified functional block diagram of an exemplary computer that can be implemented in the exemplary system of FIG. 1.

FIG. 7 is a simplified functional block diagram of an exemplary computer programmed or configured to implement embodiments of the invention. This exemplary computer 700 can also be implemented as the web server 120 or the application server 130 in the exemplary system of FIG. 1. It should be noted that the computer 700 is for illustration only, and many computer components included therein may not be shown or described in the following paragraphs.

As shown in FIG. 7, the computer 700 comprises a memory 710, a processor 720 capable of accessing the memory 710, and one or more I/O interfaces or other peripheral interfaces 730 coupled to the processor 720. Exemplary external or peripheral devices include, without limitation, a display 740, a keyboard 760, a camera 780, a printer or scanner in a combined or separate form 750, a storage device 770 such as a USB or disk, and a microphone or speaker 790. The memory 710 includes software programs or drivers for activating and communicating with each peripheral device. In one configuration, these components are connected through one or more communication buses (not shown) in the computer, which may include circuitry that interconnects and controls communications between different components.

The memory 710 includes high-speed random access memory, such as DRAM, SRAM, DDR RAM and/or other random access solid state memory devices; and includes non-volatile memory, such as flash memory devices, a magnetic disk storage device, and/or other non-volatile solid state storage devices. The memory 710, or alternately non-volatile memory device(s) within the memory 710, includes a non-transitory computer-readable storage medium. While the memory 710 is shown as being separate from the processor 720, all or a portion of the memory 710 may be embedded in the processor 520. In some embodiments, the memory 710 stores the following programs, modules and data structures, or a subset thereof: an operating system 712 that includes procedures for handling various basic system services and for performing hardware dependent tasks, and applications 514, including one or more downloaded user applications 714a and corresponding APIs 714b for processing data received from other devices and data to be transmitted to the other devices, security applications 714c, and/or multimedia applications 714d. The processor 720 is configured to access and execute the instructions, programs, applications, and modules stored in the memory 710.

Figure 8:
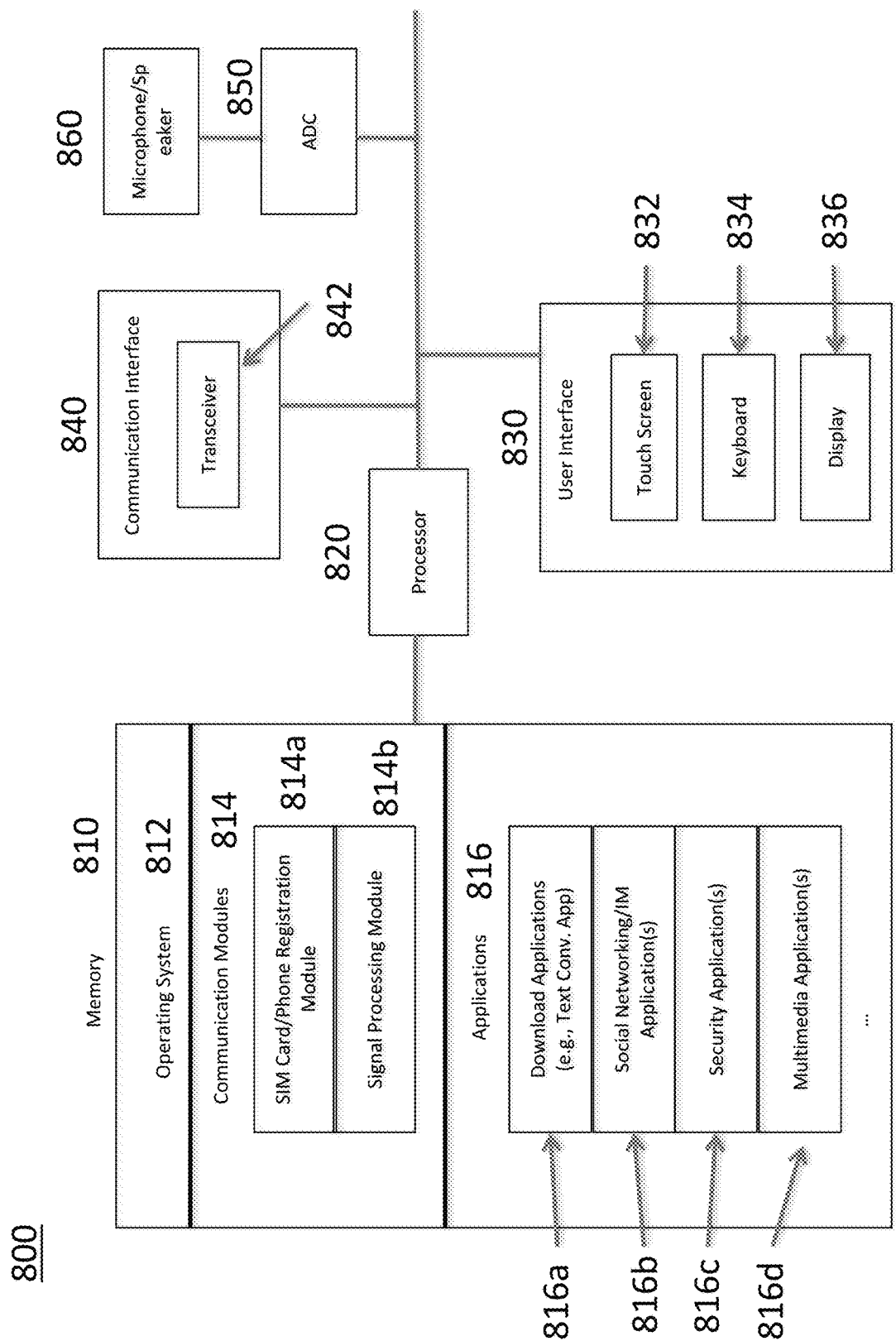
FIG. 8 is a simplified functional block diagram of an exemplary mobile device that can be implemented in the exemplary system of FIG. 1.

FIG. 8 is a simplified functional block diagram of an exemplary mobile device programmed or configured to implement embodiments of the invention. This exemplary mobile device 800 can also be implemented in the exemplary system of FIG. 1 for users to connect to the network and different application servers in the network. It should be noted that the device 800 is for illustration only, and many device components included therein may not be shown or described in the following paragraphs.

As shown in FIG. 8, the exemplary device 800 comprises a memory 810, a processor 820 capable of accessing the memory 810, a user interface 830, a communication interface 840, an Analog to Digital Converter (ADC) 850 and a microphone or speaker 860 connected to the ADC. In one configuration, all device components are connected through one or more communication buses (not shown) that may include circuitry that interconnects and controls communications between different components.

The memory 810 includes high-speed random access memory, such as DRAM, SRAM, DDR RAM and/or other random access solid-state memory devices; and includes non-volatile memory, such as flash memory devices, a magnetic disk storage device, and/or other non-volatile solid-state storage devices. The memory 810, or alternately nonvolatile memory device(s) within the memory 810, includes a non-transitory computer-readable storage medium. While the memory 810 is shown as being separate from the processor 820, all or a portion of the memory 810 may be embedded in the processor 820. In some embodiments, the memory 810 stores the following programs, modules and data structures, or a subset thereof: an operating system 812 that includes procedures for handling various basic system services and for performing hardware dependent tasks, communication modules 814 used for communicating with other devices or network controllers via the communications interface 840, such as a SIM card or phone registration module 814a and a signal processing module 814b, and applications 816, including one or more downloaded user applications 816a, various social network or messaging applications 816b, security applications 816c and multimedia applications 816d. All these applications may have associated API(s) (not shown) in the memory 810.

In some embodiments, the processor 820 is configured to access and execute the instructions, programs, applications, and modules stored in the memory 810. Through the user interface 830, the processor 820 is coupled to one or more of the following: a touch screen 832, a keyboard 834 and a display 836. The processor 820 is also coupled to a transceiver 842 via the communication interface 840.

Figure 9B:
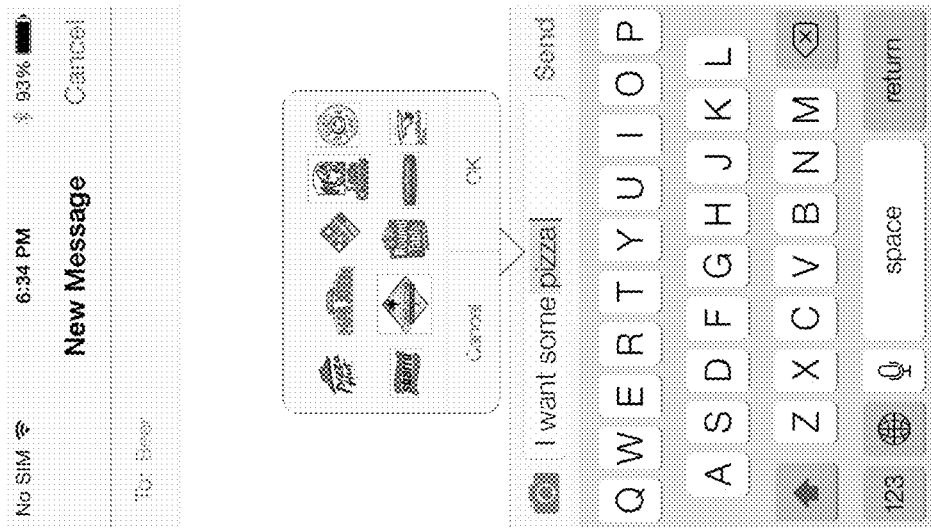
FIGS. 9a-b illustrate exemplary screen shots of additional features of the mobile application in FIGS. 3a-f according to embodiments of the invention.
Figure 9A:
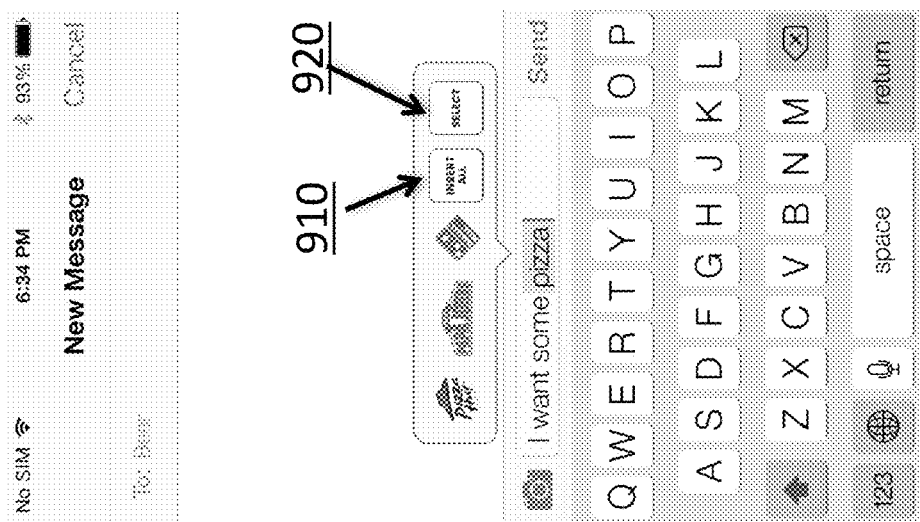

FIGS. 9a-b illustrate some additional features of the above-described mobile application according to various embodiments of the invention. As shown in FIG. 9a, when a user types "pizza" in the text or message entry space, the application brings up corresponding logos or branded images, as well as user options 910 and 920. The user option 910 allows the user to select all corresponding logos or images so that a string of logos are displayed as replacement of the word "pizza." When the user pressed the button 920, the application displays multiple corresponding logos or images for the user to select one for display. For example, FIG. 9b shows all the logos or images corresponding to the word "pizza." If the user selects one of them, the selected logo or image will be inserted in the text message as replacement of the word "pizza."

When a logo or branded image is inserted in the text message, there can be multiple ways for such insertion. For example, FIGS. 10a-l illustrate a number of ways of inserting a logo or branded image in a text entry according to various embodiments of the invention. It should be understood that the ways for insertion in FIGS. 10a-l are for illustration only, and many other variations or equivalents can be applied to achieve the same purposes.

Figure 10B:
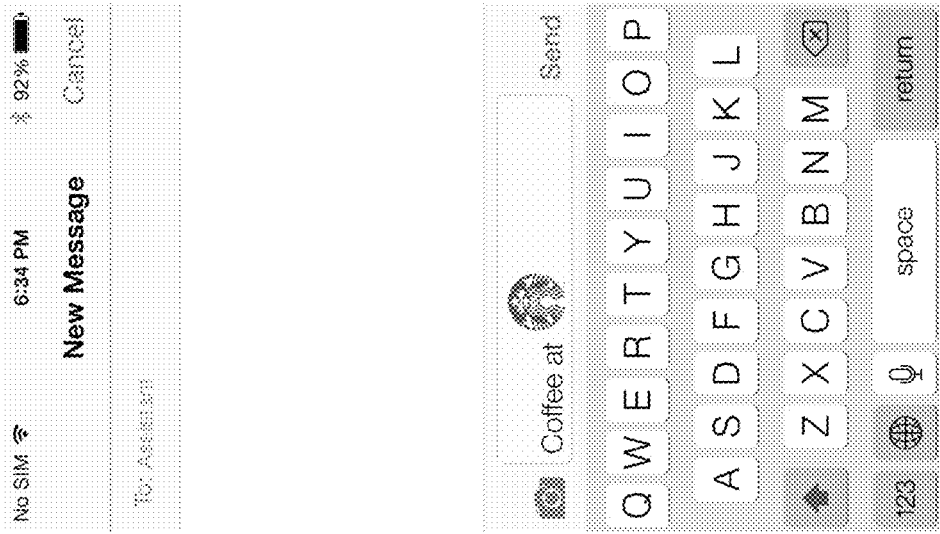
Figure 10A:
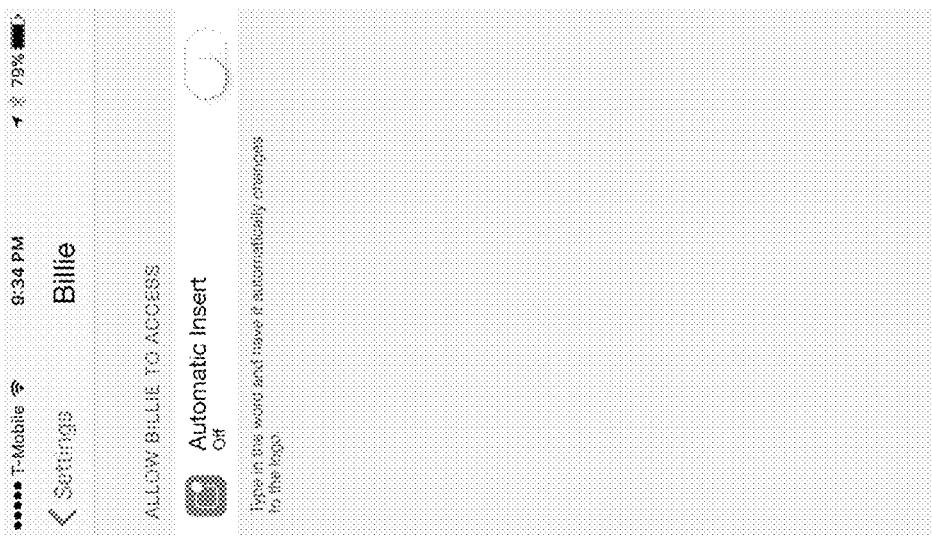

As shown in FIG. 10a, the application may provide a user option that allows for an automatic insertion of logos or images. If the user chooses to turn the option on, then the logo or branded image may be inserted in the text message automatically without requiring a separate user action to select the logo. For instance, as shown in FIG. 10b, if the user types "Starbucks," the word will be automatically replaced by its corresponding logo. In this case, the user does not need to cut and paste the logo image or confirm a logo selection by touching, tapping or pressing the selected logo.

FIGS. 10c-d illustrates another way to insert a logo, which is, the user can drag a logo, e.g., the PizzaHut logo 1001, from the displayed list of logos and drop it into the text message.

A user can use certain swiping motions for a logo to be displayed or inserted in the text entry space. As an example, in FIG. 10e, the user can make a swiping gesture 1002, and in response, the application brings up the Nike logo.

FIG. 10f demonstrates that a user can insert a logo into the text entry space through a speech or void input 1003. For example, if the user says "pizza" to the application, the corresponding logos will be displayed. Further, if the user says "pizza hut," the PizzaHut logo will be selected from displayed logos and inserted in the text message.

A user can also insert a logo by tapping or pressing a word in the text message until the word is changed into its corresponding logo(s). As shown in FIGS. 10g-h, after the user presses the word "Starbucks" long enough, the word is replaced by its logo in the text message.

Figures 10I, 10J:
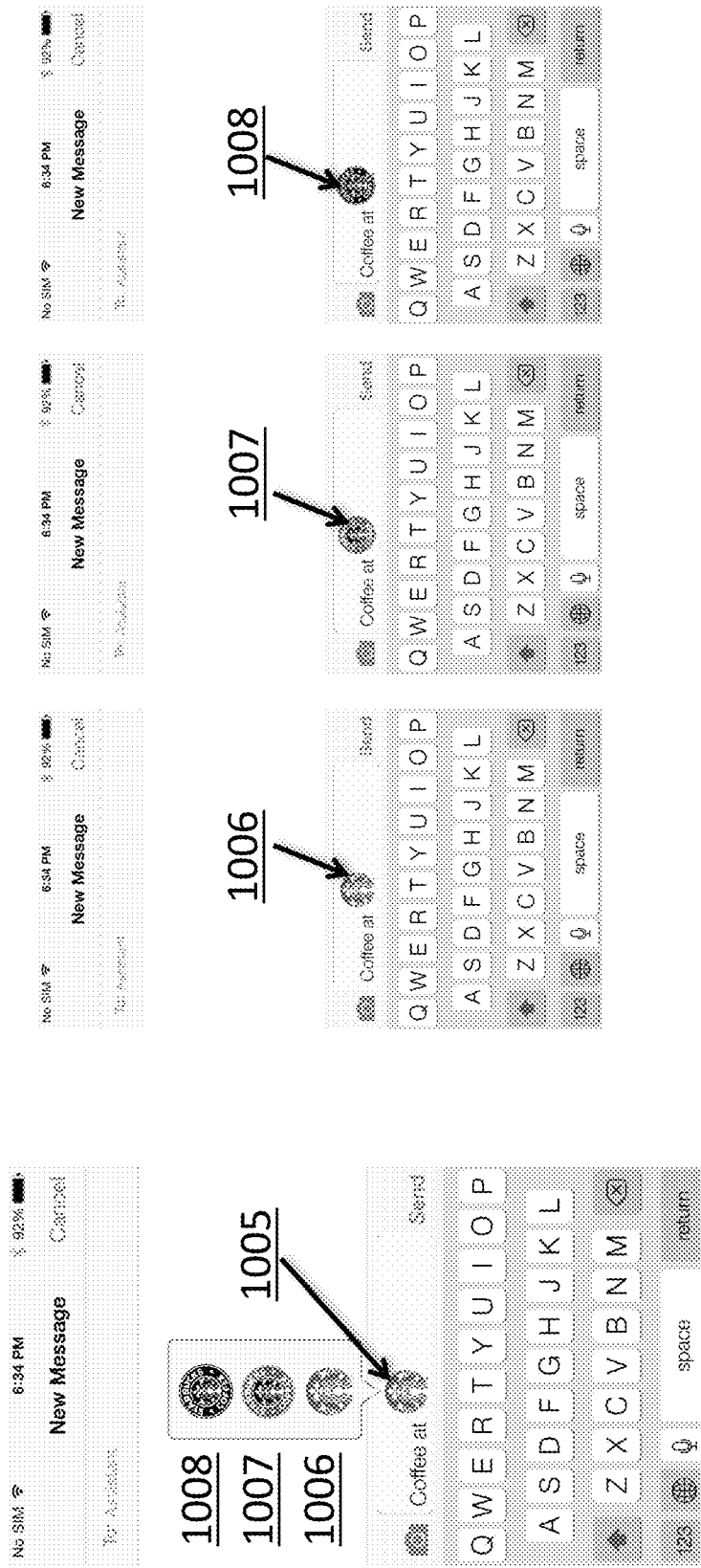

Some logos or branded images may have several variations. In that case, the application allows the user to select which version or variation of the logo to be inserted. As shown in FIGS. 10i-j, the "Starbucks" logo 1005 may have different variations 1006, 1007 and 1008. In one configuration, the user can keep pressing the word "Starbucks" until the variation the user desired to use is displayed in the text message. In another configuration, the application may display a list of variations for the user to select from, as shown in FIG. 10i, and then, upon the user selection, one of the variations can be displayed, for example, the logo variation 1006, 1007 or 1008 as shown in FIG. 10*j*.

Figures 10K, 10L:
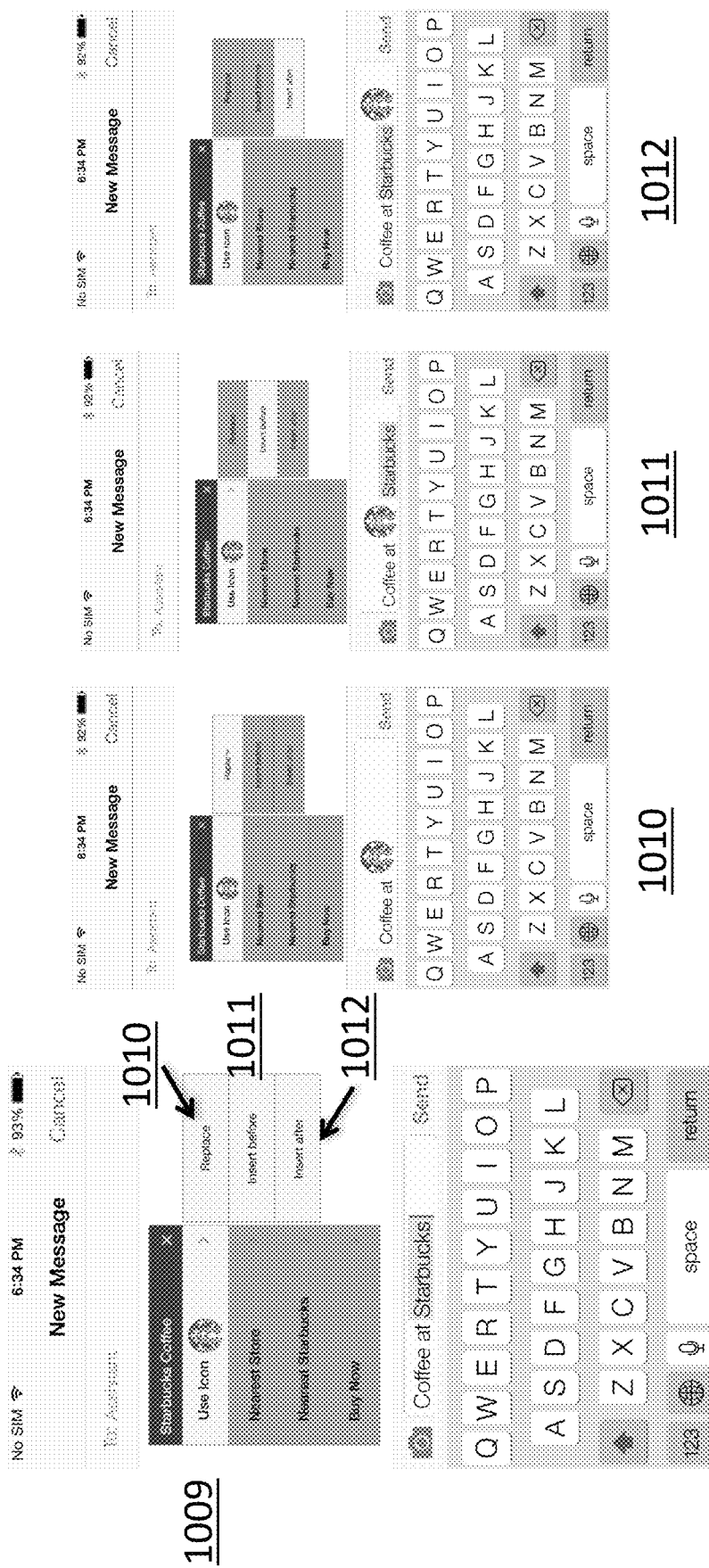

Sometimes the user may want to insert the logo before or after the corresponding word instead of replacing it. In this case, the application, as shown in FIGS. 10*k-l*, provides options for the user to select whether to replace the word (e.g., 1010), or to insert the logo before the word (e.g., 1011), or to insert the logo after the word (e.g., 1012).

Figure 11:
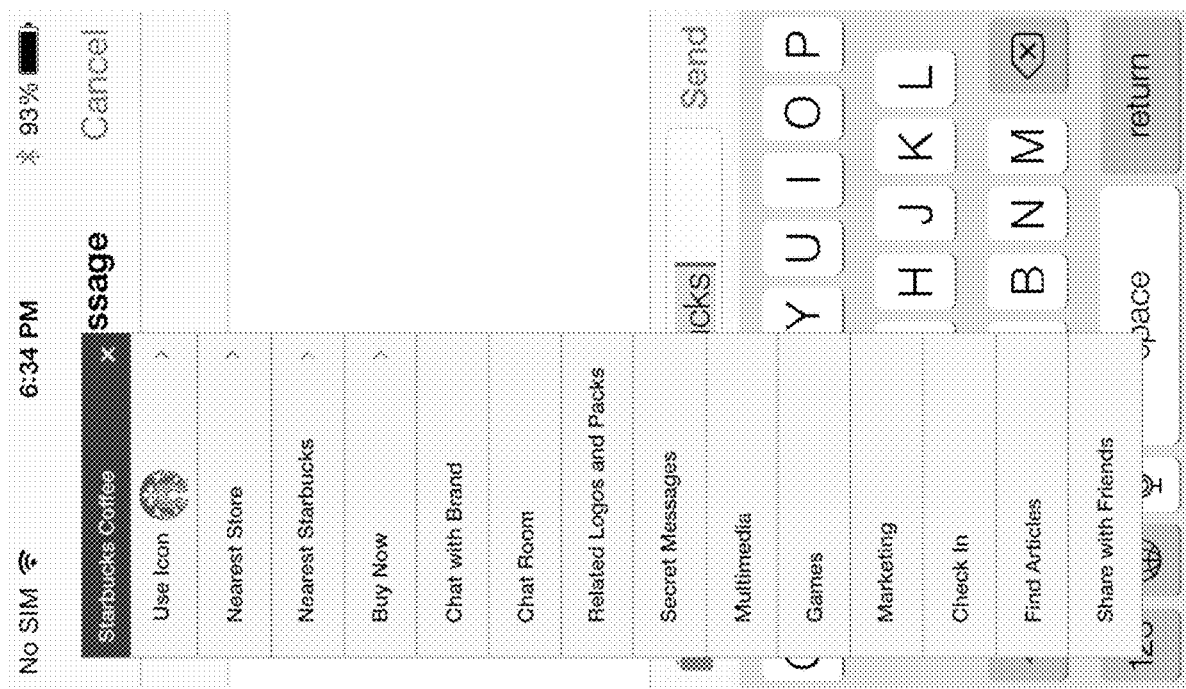
FIG. 11 and FIGS. 12a-i, 12j_1, 12j_2, 12j_3, 12j_4, 12k, 12l_1, 12l_2, 12m-q, 12r_1, 12r_2, 12s-u illustrate exemplary screen shots of additional features of the mobile application in FIGS. 3a-f according to embodiments of the invention.

As aforementioned, when the user selects a logo or branded image corresponding to a word in the text message, the user can further select one of multiple possible user actions related to the logo. For example, the user is able to choose the nearest store of the displayed logo or brand. FIGS. 11, 12*a-u* illustrate a few more user actions that can be activated upon a user selection of a logo or branded image according to various embodiments of the invention.

FIG. 11 presents a user selection bar comprising various user actions, such as "Use Icon," "Nearest Store," "Buy Now," "Chat with Brand," "Chat Room," "Related Logo," "Secret Messages," "Multimedia," "Games," "Marketing," "Check In," "Finding Articles," "Share with Friends." It should be understood that the user actions or functionalities presented in FIG. 11 are for illustration only, and there can be other variations or equivalents of these functions in different embodiments.

Figure 12B:
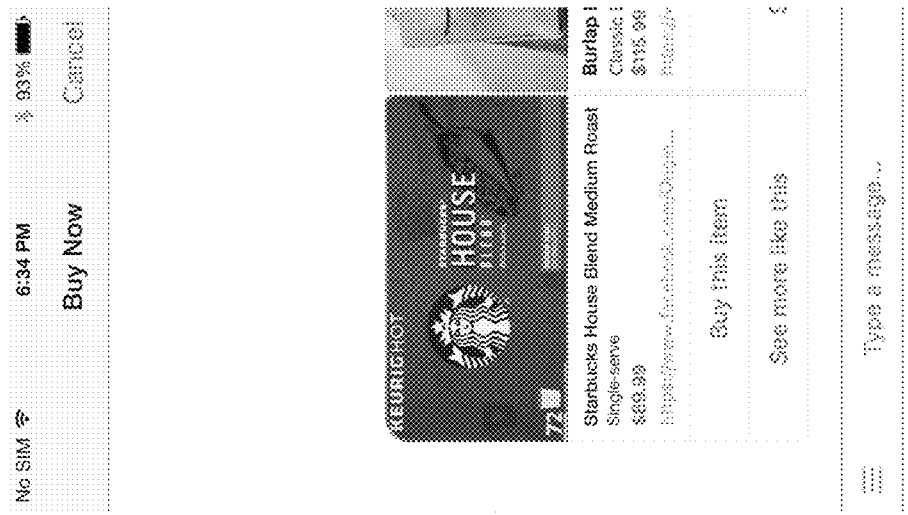
Figure 12A:
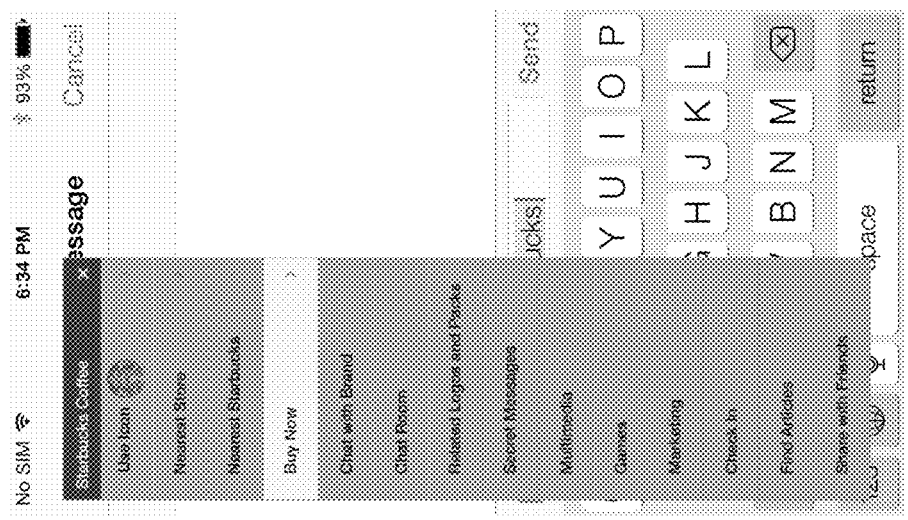

FIGS. 12*a-b* illustrates the user action or functionality of "Buy Now." In the case of the "Starbucks" logo, when the user chooses this function by clicking or touching the button on the selection bar as shown in FIG. 12*a*, the application brings up "Starbucks" items for the user to shop from. As shown in FIG. 12*b*, the user can either buy the displayed item or scroll down to see additional items. This function allows the user to buy directly from the display list rather than a separate link to the product page.

Figure 12D:
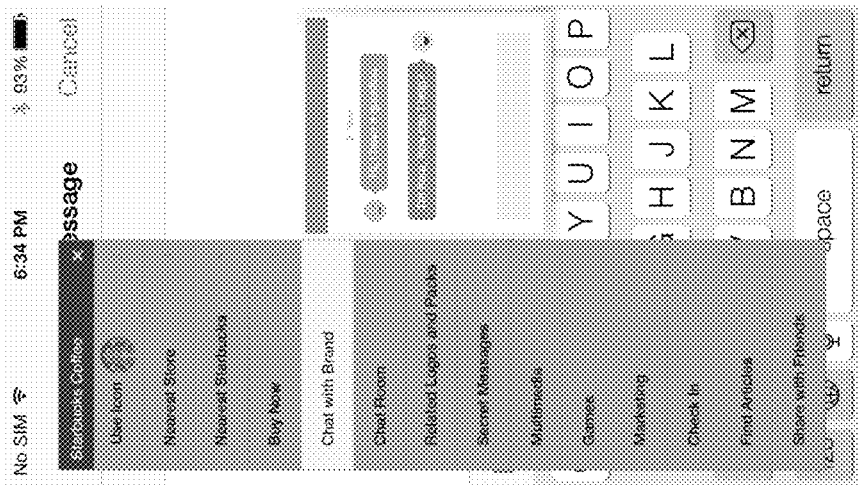
Figure 12C:
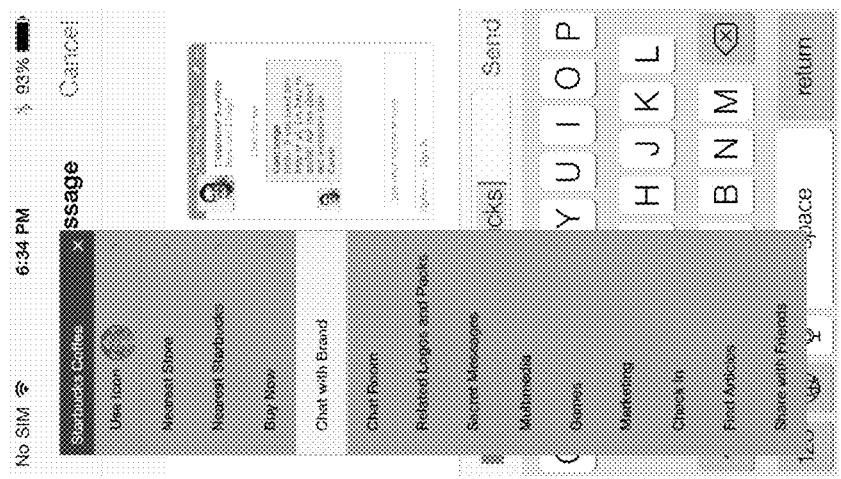

FIGS. 12*c-d* present another function or user action of "Chat with Brand," which allows the user to interact with the brand's customer service via a separate chatting window on top of the message application in the mobile device. By doing so, the user can receive real-time customer service from the company providing the branded products or services. For instance, if the user types "Starbucks" in the messaging app, having the corresponding logo displayed or buying some "Starbucks" items, the user is able to interact with Starbucks customer service directly through this function.

Figure 12F:
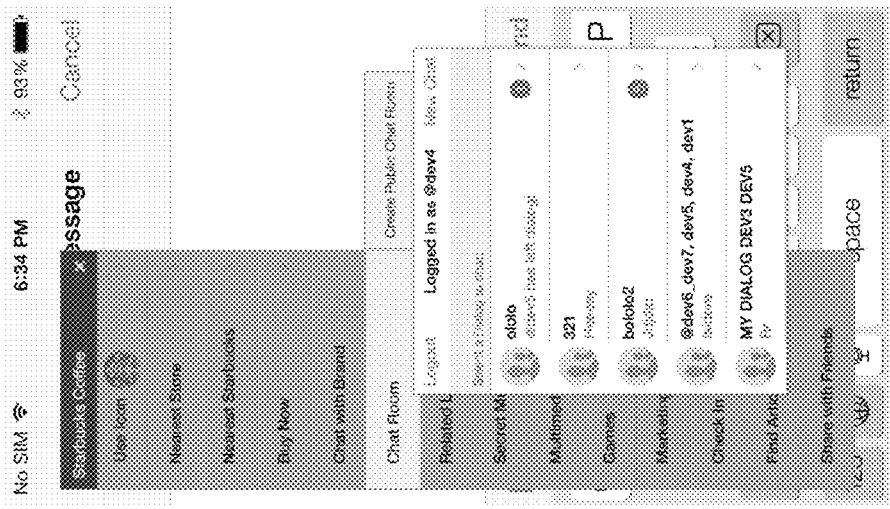
Figure 12E:
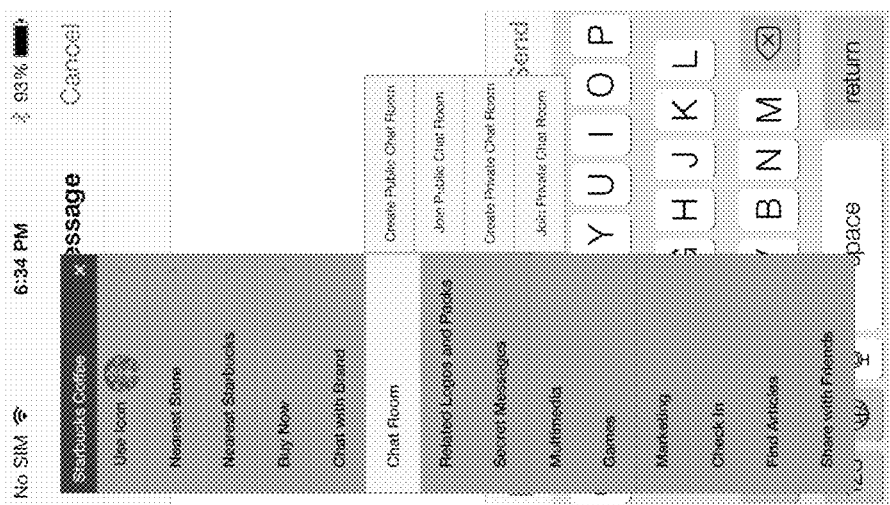

FIGS. 12*e-f* show another user action by which the user can create a private chat room or join a public chat room relating to the selected logo or branded image. Again, the chat room can be a separate chatting window or layover on the messaging app so that the user can use both at the same time. For example, the user may type the football team "Patriots" in the text message, which allows the application to display or replace the word with the corresponding logo. Then by choosing the "Chat Room" function, the user can either join a public chat room or create a private chat room for his friends to chat about the "Patriots" game performances.

Figure 12H:
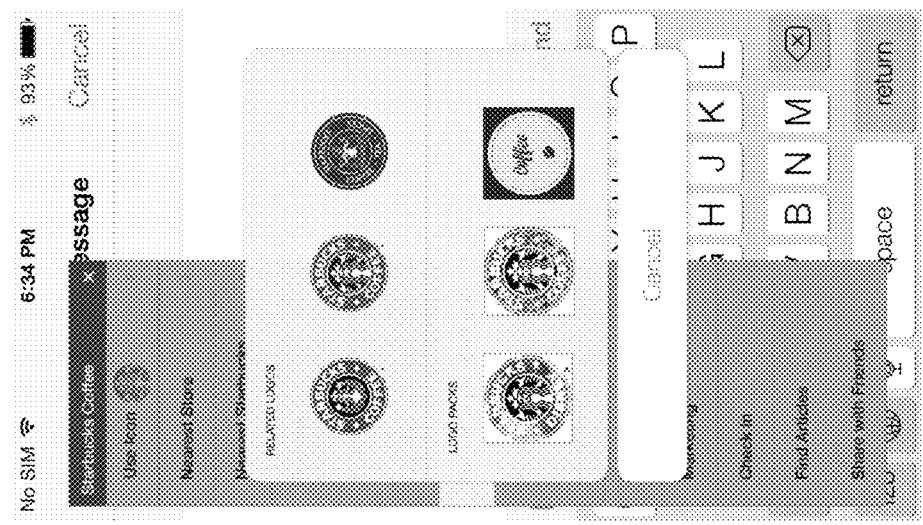
Figure 12G:
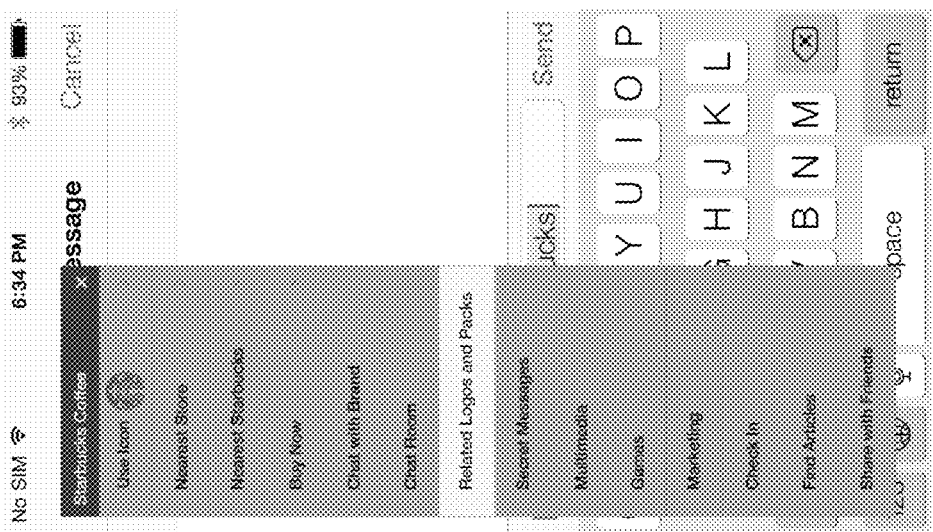

FIGS. 12*g-h* show a function or user action that allows the user to choose related logos or logo packs. For example, if the selected logo is "Starbucks" and the user chooses this "Related Logo" function, the application will show all logos related to "Starbucks," or all logo packs related to Starbucks or coffee so that the user is presented with more options to choose from.

FIGS. 12*i-j* show a "Secret Message" function related to the selected logo, which allows the user to create and send a steganographic message. In one embodiment, such steganographic or secret message is embedded in a logo or branded image. On the receiving end, if the recipient is able to unlock it, he will be able to read the embedded message, otherwise he will only see the logo or brand image. As shown in FIG. 12*j*_1 and FIG. 12*j*_2, when the user selects the "Secret Message" function, he is allowed to create a message embedded in the selected logo, e.g., Starbucks. Then, as shown in FIG. 12*j*_3 and FIG. 12*j*_4, when the recipient receives the logo message, he may tap the Starbucks logo to unlock the message, provided that he has the right fingerprint or password for his mobile device. If he does not meet the requirement for unlocking the device, then he will see nothing but the Starbucks logo.

FIGS. 12*k-l* show a "Multimedia" function that allows the user to send audio or video files that contain metadata (e.g., GIFs) associated with the displayed or selected logo. For example, as shown in FIGS. 12*l*_1 and 12*l*_2, the user may send audios or videos related to the Starbucks logo or coffee products.

Figure 12N:
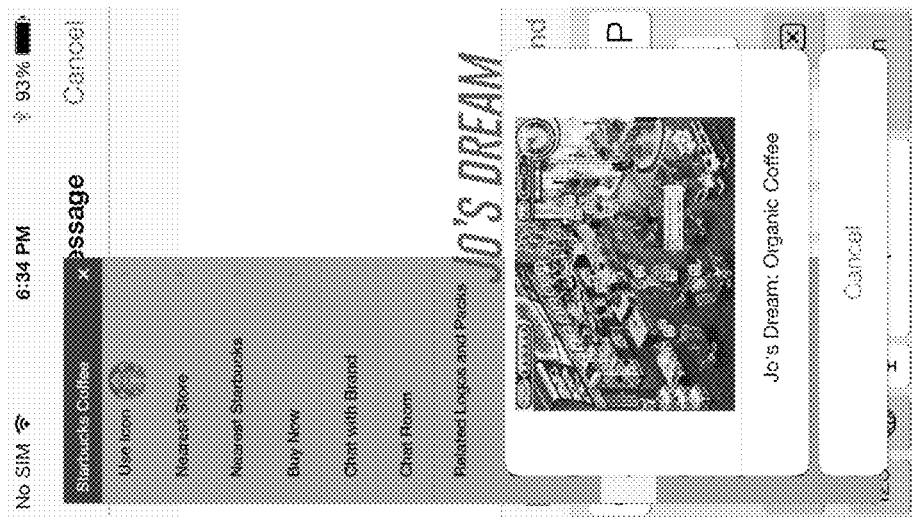
Figure 12M:
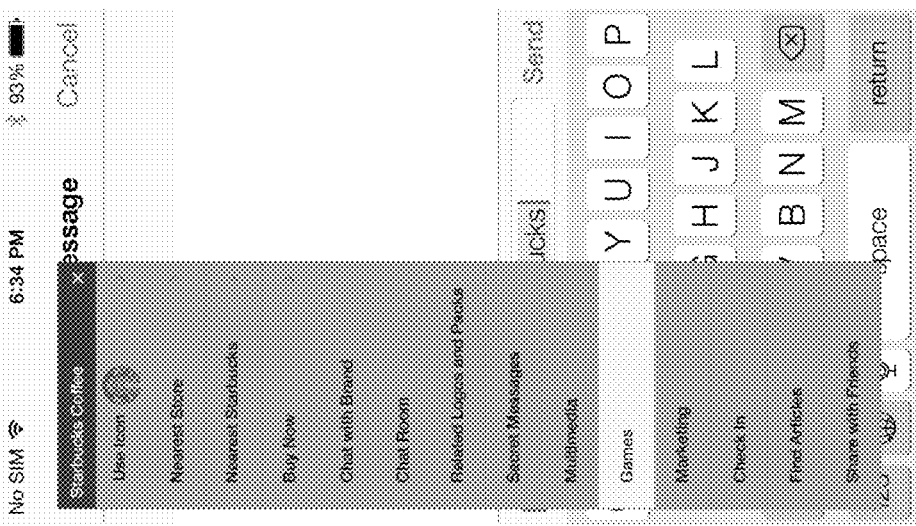

The "Games" function, as presented in FIGS. 12*m-n*, allows the user to find any games, conversations or things related to the selected logo. For instance, when the selected logo is Starbucks, this function will enable the application to bring up a video game related to coffee drinks. As another example, if the selected logo is Celtics, this function will enable the application to bring up the user's previous conversations about Celtics or football games, or any upcoming football games related to Celtics, or logos of other NBA teams.

Figures 12O, 12P:
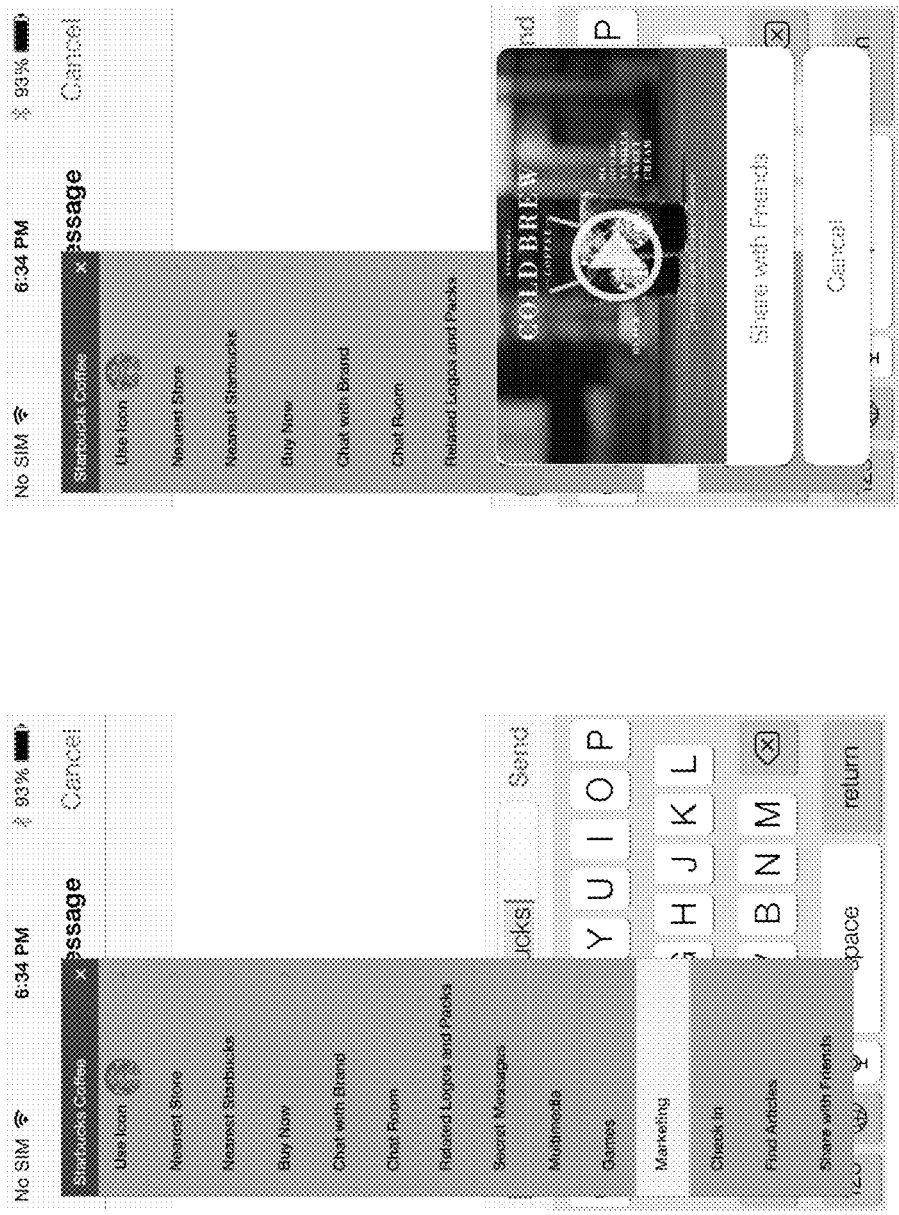

The "Marketing" function, as presented in FIGS. 12*o-p*, allows the user to view or share the latest marketing videos related to the selected logo. For example, for the selected logo of Starbucks, the user can view the recent marketing video related to the brand or send the video to his friends. As another example, if the user types a movie title in the text message, this function allows the user to view or share the movie trailer with his friends.

The "Check In" function, as shown in FIGS. 12*q-r*, allows the user to check in at a store or place related to the selected logo for any promotions or specials offered at the store. In the case of Starbucks logo, this function allows the user to check in at a Starbucks store to receive promotions.

Figures 12S, 12T:
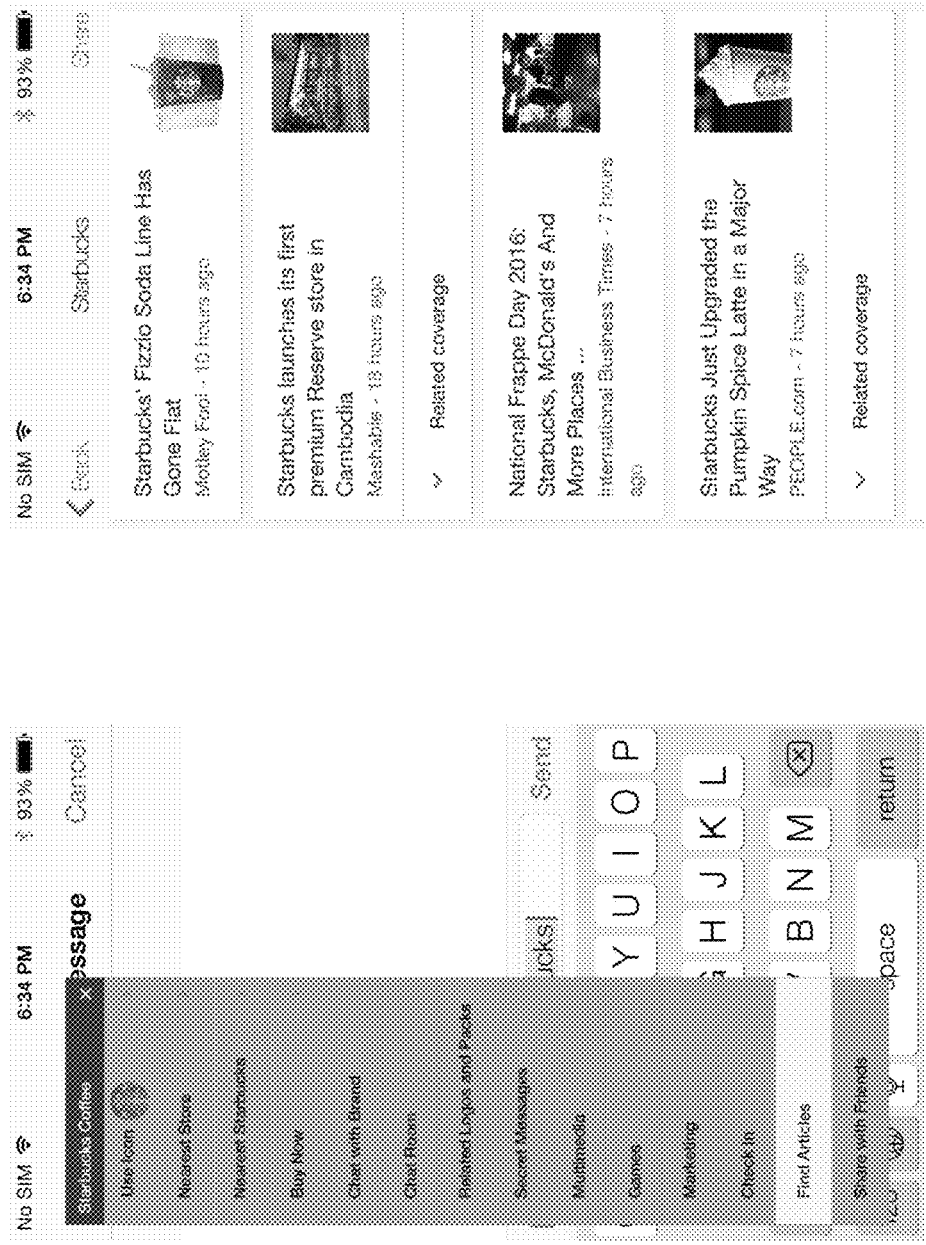
Figure 12U:
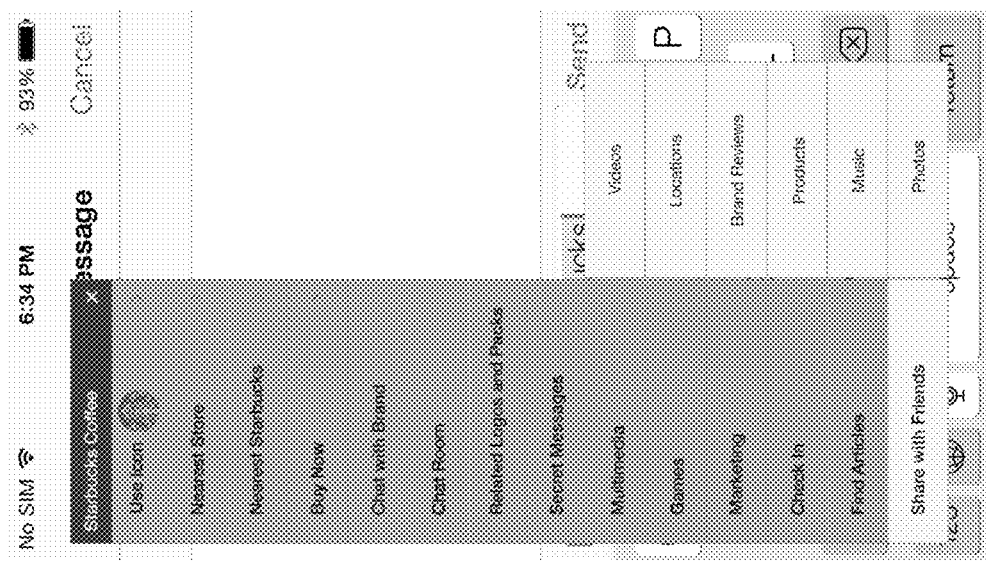

The "Find Articles" function, as shown in FIGS. 12*s-t*, allows the user to have access to any articles related to the selected logo.

The "Share with Friends" function, as shown in FIG. 12*u*, allows the user to share anything related to the logo, for example, any video, location, brand reviews, product, music, photos, songs, to his friends on his contact list.

Again, the above-described user actions or functions are only a few examples to be implemented in the inventive application. In practice, many more functionalities and variations can be implemented in different embodiments.

Figure 13:
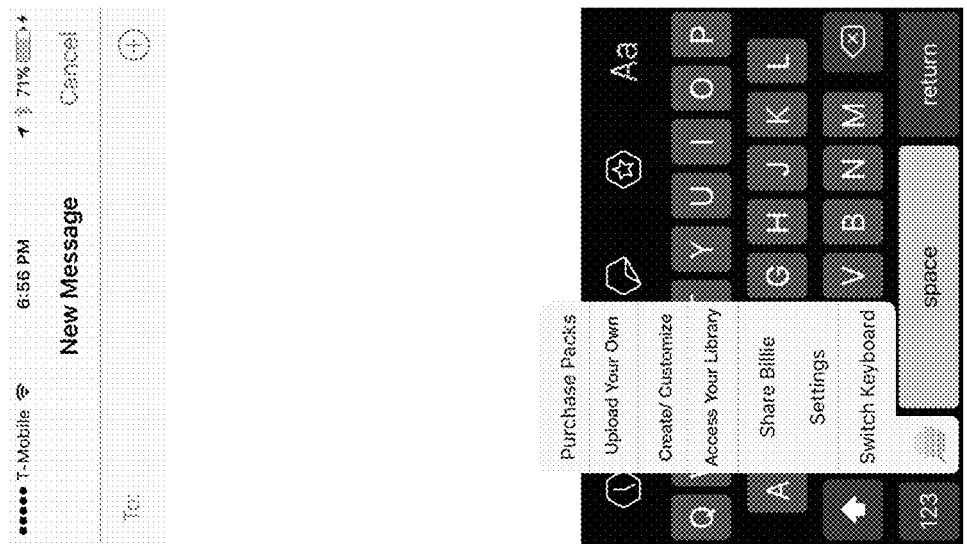

Besides using existing logos or branded images, the application is configured to allow for any creation, customization or modification of logos. FIGS. 13, 14*a*-17*b* illustrate some exemplary scenarios where a user can customize or create his own logos according to various embodiments of the invention. For example, as shown in FIG. 13, the application provides such functionalities as "Upload Your Own" logos, "Create or Customize" logos, or "Access Your Library" of logos on a bar of user selections. Details of these functions will be described below with references to FIGS. 14*a-b*, 15*a-b*, 16*a-c* and 17*a-b*.

FIGS. 14*a-b* present the "Create or Customize" functionality that allows the user to create or customize his own logos, stickers, contents, apps or packs within the keyboard.

For example, as shown in FIGS. 14b_1 to 14b_4, this function allows the user to create a logo using his own initials, e.g., "MC." The created logo "MC" is saved in the user database so that when the user types his name in the message, his name can be replaced by the corresponding "MC" logo.

FIGS. 15a-b present the "Upload Your Own" functionality, which allows the user to upload his own logos. As shown in FIGS. 15b_1 to 15b_4, once the user uploads his own logo, the uploaded logo will be stored in the user database so that when the user types certain words using the message app, this logo can be displayed, as with other existing logos.

A user can upload either existing logo images or create a logo or image to upload into the user database. In one embodiment, as illustrated in FIGS. 16a-c, the user can use the camera function of the mobile device to take a photo of certain logos or branded images, for example, a business card with the Nike logo, and then application automatically creates an emoji or logo variation based on the photo. Such created emoji or logo variation can be uploaded and stored in the user database for later use. In other embodiments, the application may allow the user to hand draw an image, or add texts in an image or add photo frames to an image, and so forth. Based on the user-created image will be created into an emoji ("emojified") and uploaded into the user database.

Figure 17B:
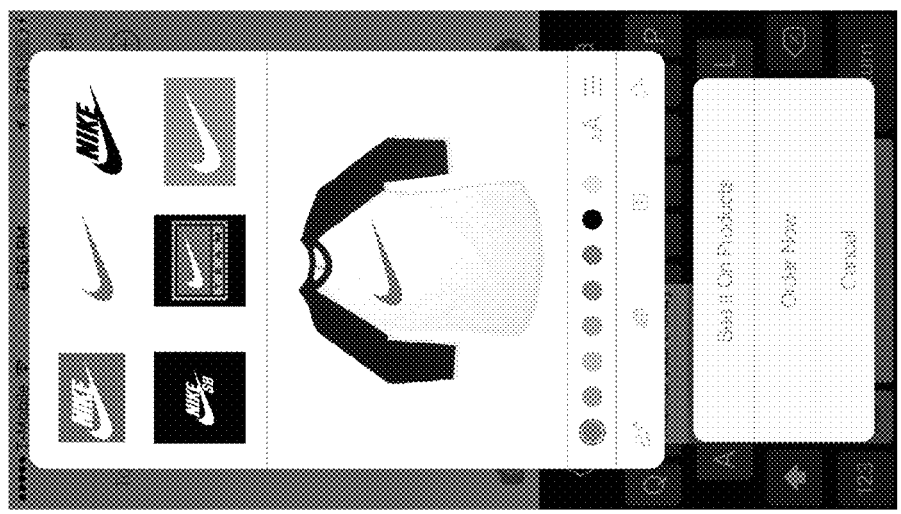
Figure 17A:
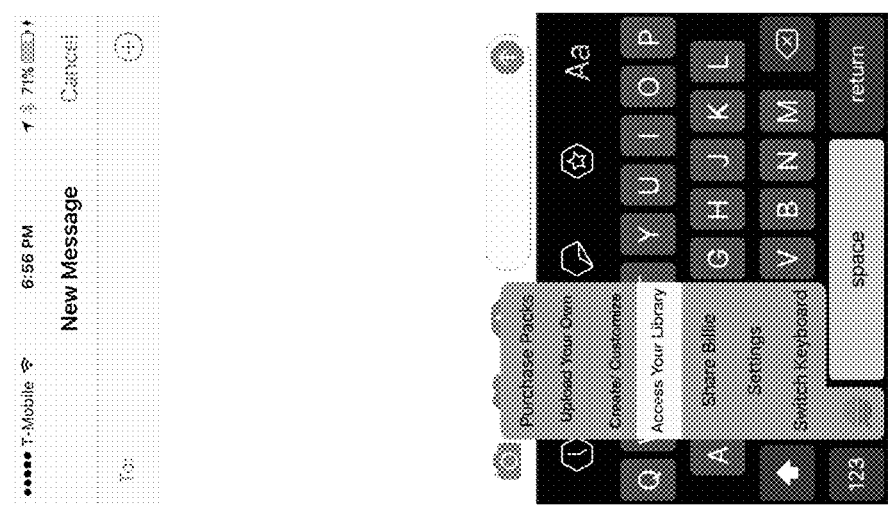

FIGS. 17a-b show the "Access Your Library" functionality, which allows the user to access his library of logos for additional uses. For example, as shown in FIG. 17b, the user may select one of the Nike logos in the library, apply the selected logo to a t-shirt and order the customized t-shirt with the logo on it. Similarly, the user can order other products bearing the logo. The user can also use the logo for other purposes, like creating a screensaver, customize a photo, change the logo color, etc.

In one embodiment, the inventive application is implemented with mobile communication applications that have mapping function and utilize location data (e.g., Google Maps, Google Earth, Apple Maps, Waze, Airline Apps, Uber, Airbnb, Foursquare, Yelp, running applications). According to this embodiment, the inventive application has any number of the above-described functionalities and further filters the associated branded icons, logos, and images to only display those associated with brands that have geographical presence in the vicinity of the mobile device. The range of the vicinity can be arbitrarily defined by a user or by the application's algorithm. FIGS. 18a-f show two examples using Snap Map and Apple Maps to demonstrate this embodiment.

In FIGS. 18a-c, a first example is presented wherein the inventive application is able to perform one or more of the following functionalities: (1) intelligently detect any keyword or pre-defined term associated with corresponding brands; (2) display a list of branded icons, logos, and images that are associated with the keyword or pre-defined term and have geographical presence in the vicinity of the mobile device; (3) allow a user to select a brand icon, logo, or image; and (4) display on the map locations of places associated with the user-selected branded icon, logo, or image.

Referring to FIG. 18a, the mobile device location 1802 is shown on a map 1804 in an application with mapping function 1800 (e.g., Snap Map). In FIG. 18b, when a text entry 1810, such as "Starbucks", is entered into the search box 1811, the inventive application intelligently detects and recognizes that the text entry "Starbucks" 1810 is a pre-defined term associated with a corresponding brand (i.e., Starbucks) and has store locations near the mobile device. The inventive application then displays a list of branded icons, logos, and images 1814 that are associated with "Starbucks" 1810 for the user to select from. In FIG. 18c, once the user selects a branded icon 1816 from the list of icons, logos, and images 1814, at least one location for Starbucks is shown on the map 1804.

FIGS. 18d-f show another example wherein the inventive application is configured to display marketing information such as promotions and specials offers for brands in the geographical vicinity of the mobile device. As shown in FIG. 18d, the location 1860 of the mobile device is shown in Apple Map 1850 and a search box 1861 is displayed at the bottom of the map 1850. In FIG. 18e, once a text entry 1862 is received in the search box 1861, the application intelligently detects that the text entry 1862 contains a keyword or pre-defined term associated with corresponding brands (e.g., "coffee") and displays a list of branded icons, logos, and images that are associated with the keyword or pre-defined term 1862 and have geographical presence in the vicinity of the mobile device. In this example, the application finds brands associated with the keyword or pre-defined term "coffee" 1862 and displays a list of associated icons for brands that have geographical presence in the vicinity of the mobile device. In FIG. 18f, when the user selects one of the branded icons 1864, which in this example is "Oren's" 1866, a button 1868 linked to a promotional code for the selected branded icon 1866 appear in an information box. By touching or clicking on the button 1868, a user can perform actions such as redeem the promotional code and/or access the selected brand's application or website.

According to another embodiment, the inventive application is implemented with mobile communication applications to share links to and/or marketing information for third-party on-demand service applications such as food ordering. Shown in FIGS. 19a-f are two examples that demonstrate this embodiment by using food ordering applications Caviar and Postmates.

FIGS. 19a-c illustrate exemplary screenshots of the on-demand service functionality in a messaging application 1900 such as SMS. As shown in FIG. 19a, when the application receives a text entry 1910 containing a keyword or pre-defined term 1912 that is associated with an on-demand service such as food ordering (e.g., "order" or "delivery"), the application intelligently detects the keyword or pre-defined term 1912. Once the application has determined that the keyword or pre-defined term 1912 is associated with food ordering, the application brings up a string of branded icons 1914 associated with various third-party food ordering applications (e.g., Postmates or Caviar). In FIG. 19b, if an icon 1916 (e.g. Caviar) is selected, an information box 1918 appears with the option for the user to share links and/or marketing information, such as a promotional code, associated with the selected brand. In this example, a button 1920 is displayed in the information box 1918 to allow the user to share a link and a promotional code for Caviar. As shown in FIG. 19c, once the button 1920 has been pressed, a linked icon 1924 and a promotional code 1926 for Caviar are displayed in the text message 1922. A link may be embedded in the linked icon 1924, which if pressed would redirect the user to the Caviar application or its website to redeem the promotional code 1926.

FIGS. 19d-f illustrate exemplary screenshots of the on-demand service functionality in the search function of a social networking application 1940 such as Snapchat. As shown in FIG. 19d, when the search box 1951 receives a text entry 1950 containing a keyword or pre-defined term 1952 that is associated with food ordering (e.g., "order" or "delivery"), the inventive application intelligently detects the keyword or pre-defined term, and then brings up a list of branded icons 1954 associated with various third-party food ordering applications (e.g., Postmates or Caviar) for the user to select from. In FIG. 19e, if a branded icon 1955 (e.g. Postmates) is selected, an information box 1956 appears with the option for the user to share a link and/or marketing information, such as a promotional code, associated the selected brand. In this example, a button 1958 is displayed in the information box 1956 to allow the user to share a link and a promotional code for Postmates. In FIG. 19f, once the user presses the button 1958, the link and the promotional code for the selected food ordering application are shared through the social networking application 1940. In this example, a link is embedded in the shared content 1960, which if pressed would redirect the user to the Postmates application or its website and allow the promotional code to be redeemed.

In addition to food ordering, the inventive application may also be implemented with other on-demand service applications. For example, the inventive application may be used to share links to and/or promotional information for cab-hailing applications such as Uber or Lyft, hospitality services such as Airbnb, and housekeeping services such as MaidsApp.

In another embodiment, the inventive application may be implemented in a mobile communication application for lifestyle or online dating applications such as Match.com, Coffee Meets Bagel, Tinder, etc. FIGS. 20a-c illustrate exemplary screenshots of a user-interface 2000, wherein the inventive application is implemented with the online dating application Match.com. When a text entry 2010 (e.g., "Let's meet at Starbucks") is received, the application determines if the text entry 2010 contains any keyword or pre-defined term 2012 that corresponds to one or more branded icons, logos or images. This word or term 2012 can be a brand name or trademark word, for example, "Starbucks" as shown in FIG. 20a, or a generic search word, such as "coffee", which may be pre-defined to correspond to a number of coffee brands, e.g., Starbucks, Coffee Bean & Tea Leaf, etc. Referring to FIG. 20b, once such a keyword or pre-defined term 2012 is identified, the application automatically displays one or more corresponding icons, images or logos 2020, from which the user can select one to replace the word or term 2012 in the text entry 2010. As shown in FIG. 20c, if the user selects the logo image 2022 to replace the term "Starbucks", the corresponding icon 2014 will be displayed in the text entry 2010.

Figures 21A, 21B, 21C:
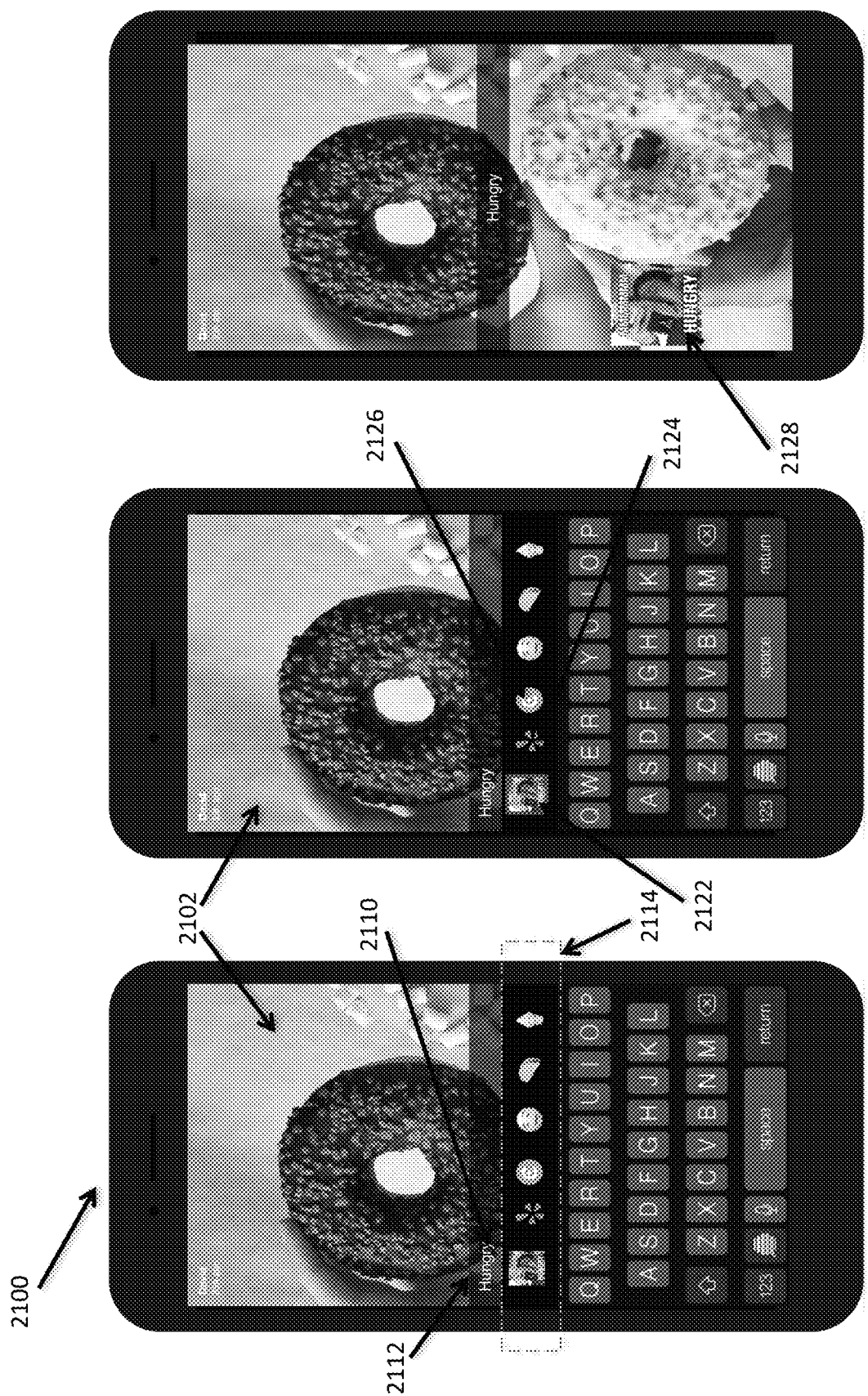
FIGS. 21a-c illustrate exemplary screenshots of the inventive application implemented in connection with a mobile application for online entertainment and/or video-sharing according to embodiments of the invention.

In one embodiment, the inventive application can be implemented with a mobile communication application for online entertainment, such as video-sharing applications (e.g., YouTube, Snapchat, Tencent Video) or music applications (e.g., Spotify, Pandora). By using the inventive application, a user may choose to display branded icons, logos, or images in the caption or the comments of a video or music file. FIGS. 21a-c show an example of the inventive application implemented with Snapchat, wherein a user is able to share a video with a caption that displays one or more branded icons, logos, or images.

As shown in FIG. 21a, when a user records a video 2102 on Snapchat 2100 and types a text entry 2110 "Hungry" into the message entry space, the inventive application intelligently recognizes "Hungry" as a keyword or pre-defined term 2112. The inventive application then brings up a list of branded icons, logos, and images 2114 for the user to select from. In this example, the list 2114 contains, among others, an image 2122 associated with the word "Hungry", a branded icon for the food-ordering application Caviar 2124, and another branded icon for the business review application Yelp 2126. If the user selects the image 2122, as shown in FIG. 21b, then the image 2122 will be displayed, as shown in FIG. 21c. If the user selects one of the branded icons for Caviar 2124 or Yelp 2126, the user will have the option to share a promotional code and/or link to the third-party application in a manner similar to that is shown in FIGS. 19d-f.

In yet another embodiment, the inventive application may be implemented in a mobile communication application for e-commerce or online shopping, such as Amazon, eBay, or Apple Store, allowing a user to post reviews in the shopping application and perform a number of other functions such as inserting branded icons, logos or images for display.

Figures 22A, 22B:
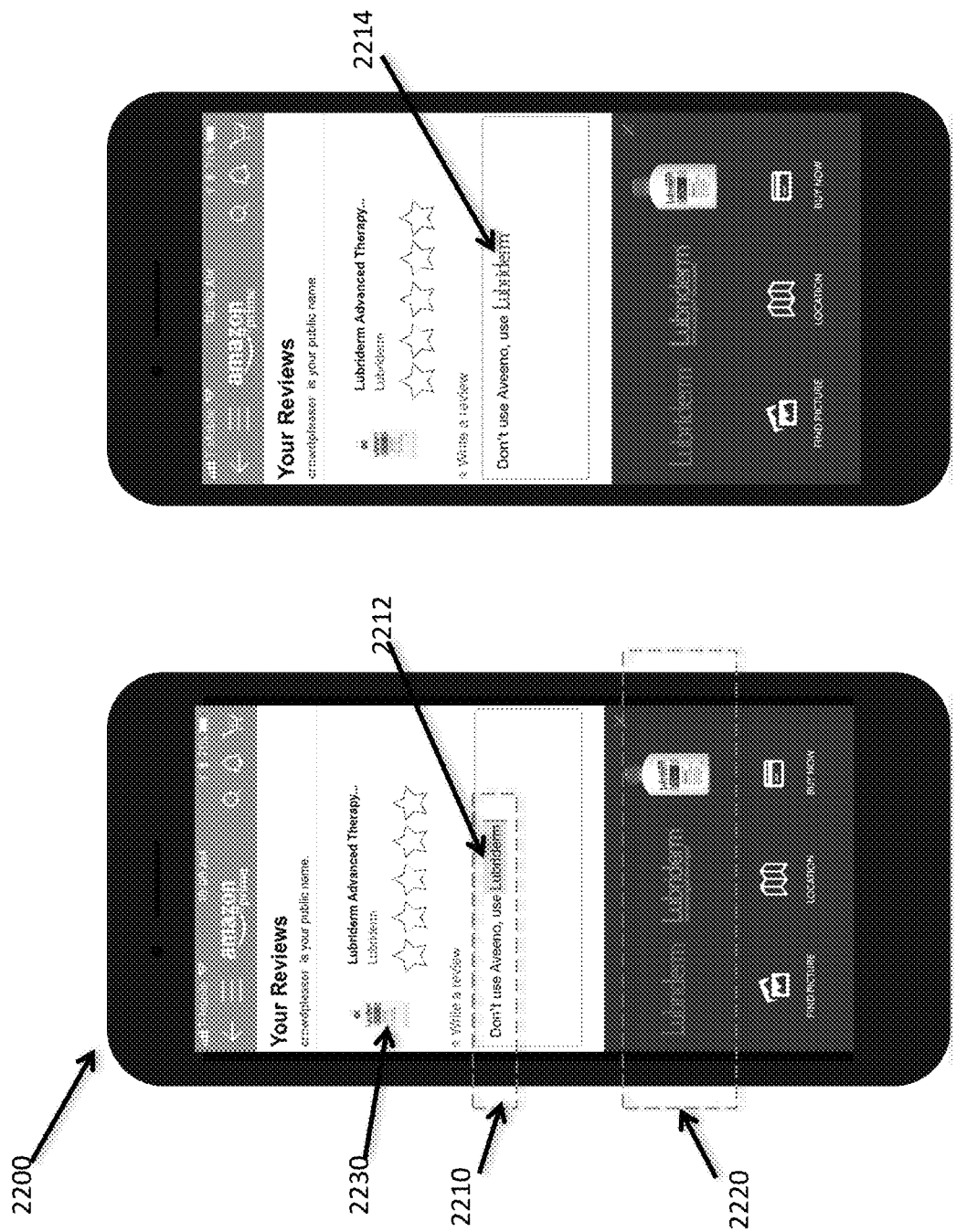
FIGS. 22a-b illustrate exemplary screenshots of the inventive application of the implemented in connection with a mobile communication application for e-commerce or online shopping according to embodiments of the invention.

The exemplary screenshots in FIGS. 22a-b show one such instance where a user leaves a product review and recommends a different brand by incorporating a logo of the recommended brand in the review. As shown in FIG. 22a, when a text entry 2210 (e.g., "Don't use Aveeno, use Lubriderm") is received in the review section for a product 2230, the application determines if the text entry 2210 contains any keyword or pre-defined term 2212 that corresponds to one or more branded icons, logos or images. This word or term 2212 can be a brand name or trademark word, for example, "Lubriderm" as shown in FIG. 22a, or a generic search word, such as "lotion," which may be pre-defined to correspond to a number of other lotion brands. Once such a keyword or pre-defined term 2212 is identified, the application automatically displays one or more corresponding icons, images or logos 2220, from which the user can select one to replace the word or term 2012 in the text entry 2010. As shown in FIG. 22b, if the user selects the logo image 2222 to replace the term "Lubriderm," the corresponding logo for Lubriderm 2014 will be displayed in the text entry 2010.

In another embodiment, the inventive application and all its functionalities described herein are not limited to instant message applications, and may be implemented with store-and-forward types of messages, such as email. For example, FIGS. 23a-b illustrate two such examples wherein the inventive application and its functionalities are implemented with an email client application (e.g., Microsoft Outlook) and a browser-based email client (e.g., Gmail and Yahoo! Mail).

Figures 23A, 23B:
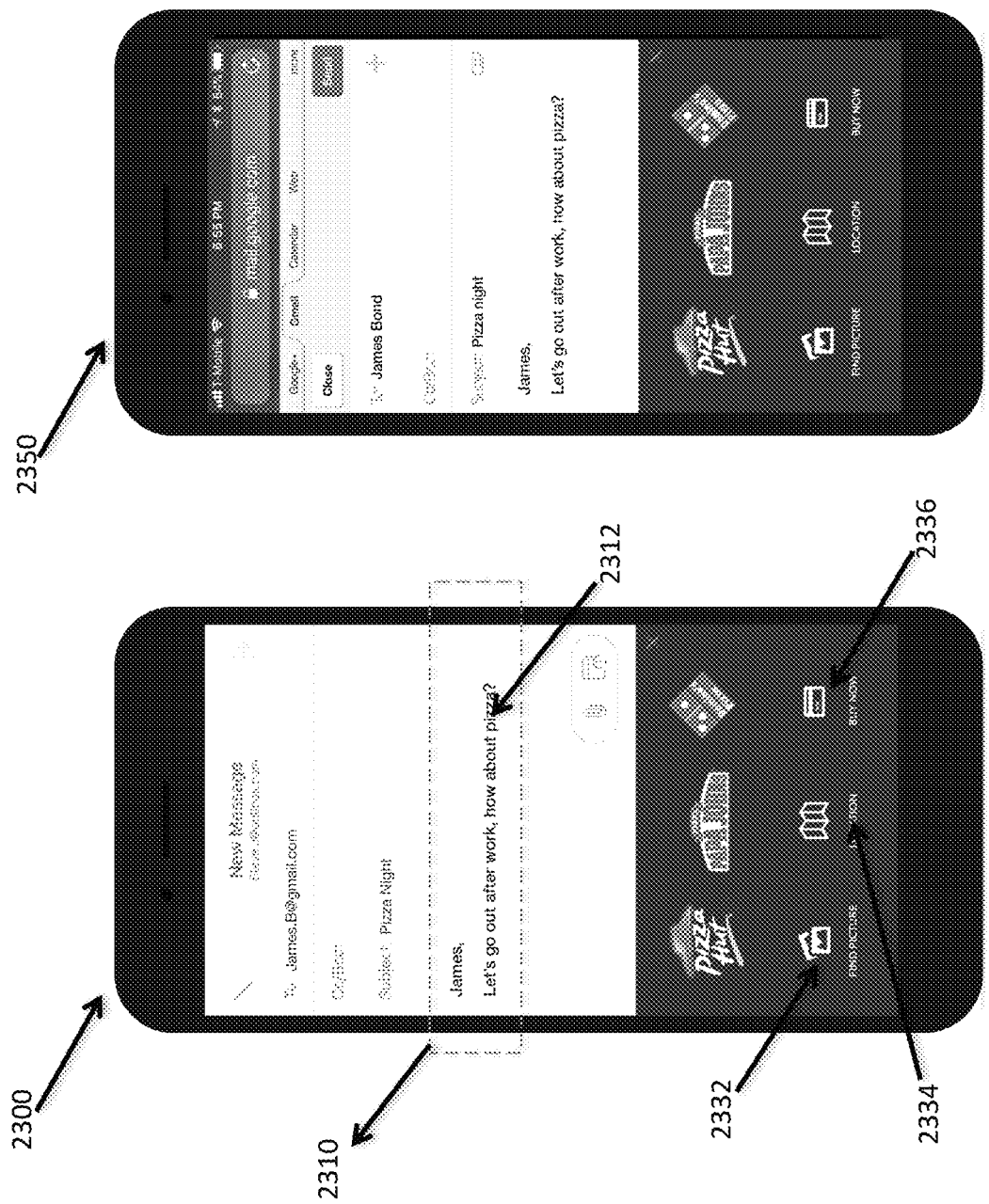
FIGS. 23a-b are exemplary screenshots of the inventive application implemented with an email client application and a browser-based client application according to embodiments of the invention.

As shown in FIG. 23a, when text is received in an email client application 2300 such as Microsoft Outlook, the inventive application performs the steps as described above to determine whether the text entry 2310 contains any keyword or pre-defined term 2312 that corresponds to one or more branded icons, logos or images. If such a keyword or pre-defined term 2312 is found, the application displays one or more corresponding branded icons, logos or images, and provides the user the option to replace the keyword or predefine term 2312 with one of the above branded icons, logos or images, or perform any number of the other functionalities described in other parts of this specification such as allowing the user to find other related logo pictures (i.e., "Find Picture" 2332), locate a brand store on a map ("Location" 2334), purchase branded products and/or services ("Buy Now" 2336), etc. FIG. 23b shows that, alternatively, the inventive application may also be implemented with a web-browser application to allow a user to use the inventive application with browser-based email clients 2350 (e.g., Gmail).

Figures 24A, 24B, 24C:
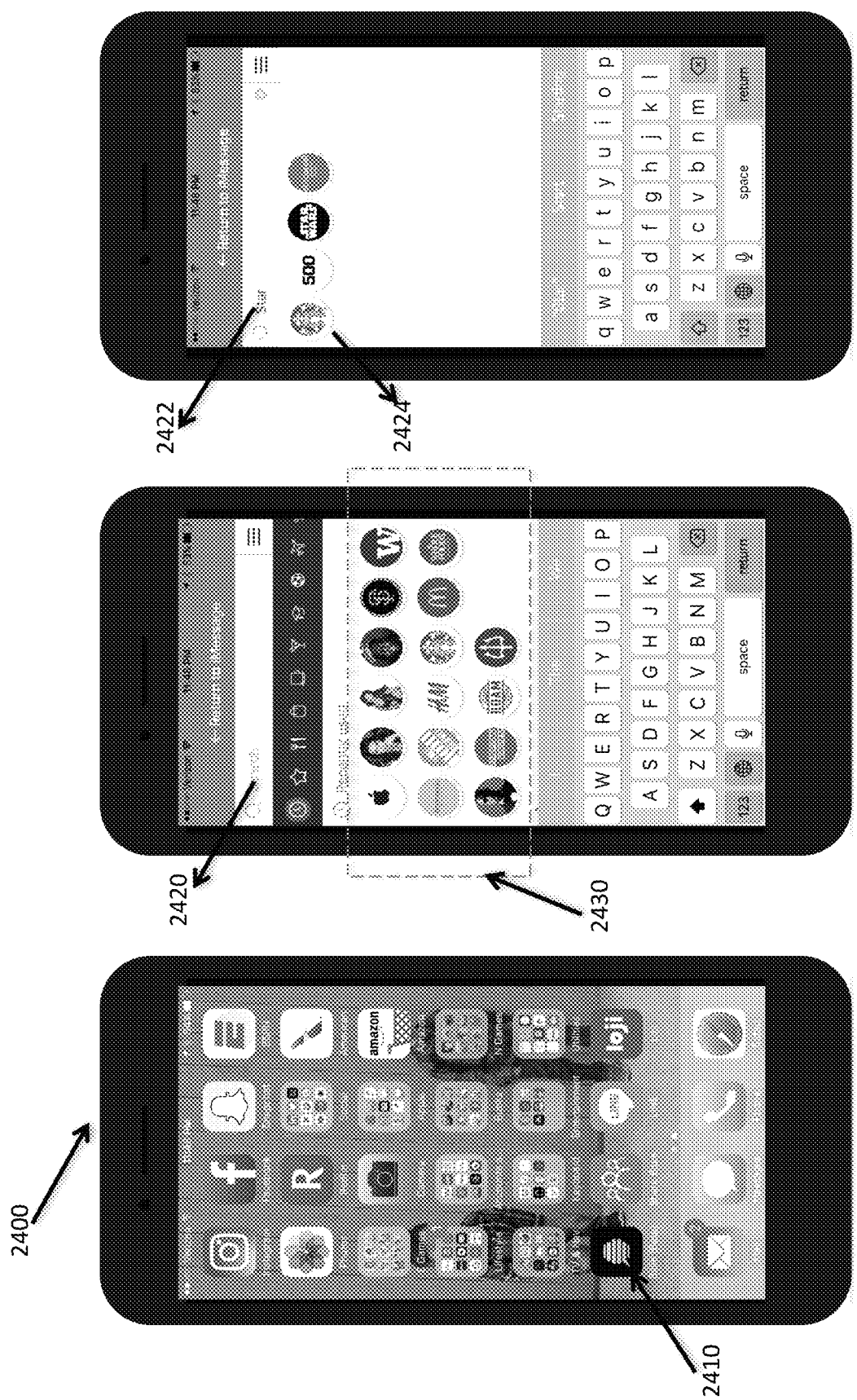
FIGS. 24a-c are exemplary screenshots of the inventive application implemented as a container application according to embodiments of the invention.

Embodiments of the inventive application and associated functionalities as described herein can be implemented in not only a stand-alone application, but also a container application, as shown in FIGS. 24a-c. When a user clicks the application button 2410 in FIG. 24a, in one embodiment, the inventive application displays a list of applications 2430 that the user has recently used as shown in FIG. 24b. The user can enter a text entry in the search box 2420 in FIG. 24b. Based on the text entry, for example, a search word "star" 2422, the application determines which applications may correspond to the search word and then only displays those applications. This makes it easier for the user to quickly select the application desired to use, for instance, the "Starbucks" application 2424.

Figure 25:
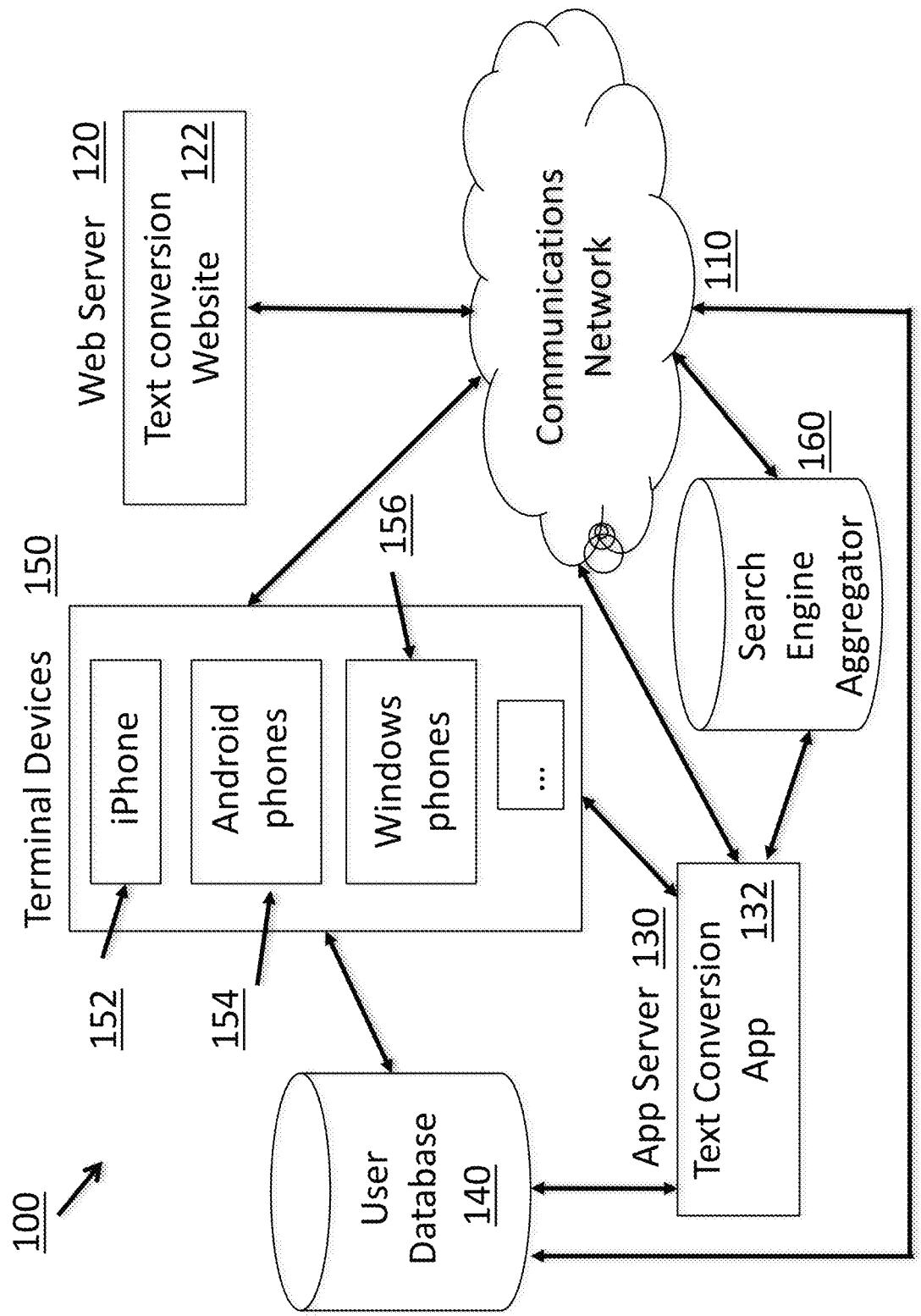
FIG. 25 is a high-level overview of an alternative exemplary system in which embodiments of the invention can be implemented.

FIG. 25 presents an alternative framework for implementing various embodiments of the inventive application. As compared to FIG. 1, the system framework in FIG. 25 includes a search engine aggregator 160, which is configured to communicate with the text conversion application 132. In operation, when the application 132 receives a text entry containing a pre-defined brand word or search term, the search engine aggregator 160 searches on the internet instead of the pre-existing database (e.g., user database 140) to identify related logos, icons or branded images. In this embodiment, a larger number of logos, icons or branded images available over the internet can be easily incorporated in the inventive application.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements or controllers may be performed by the same processing logic element or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for converting and displaying a user input in a mobile device, comprising:
receiving a user input in a mobile communication application,
wherein said user input comprises a text entry including a predefined term;
displaying one or more image entries corresponding to the predefined term in the user input,
wherein each of the one or more image entries is associated with one of a plurality of brands;
receiving a first user selection comprising a selected image entry from the displayed image entries,
wherein the selected image entry is associated with a selected brand from the plurality of brands;
in response to said first user selection, displaying a menu comprising one or more menu options associated with the selected brand, the one or more menu options comprising an option to locate a nearest store associated with the selected brand;
receiving a second user selection comprising the option to locate the nearest store associated with the selected brand;
determining a user location where the user input is received;
determining a store location of the nearest store associated with the selected brand, based on the user location; and
displaying the store location on a map of a map application.

2. The method of claim 1, wherein the map application displays the user location.

3. The method of claim 2, wherein the selected image entry is displayed in the map proximate to the store location.

4. The method of claim 1, further comprising:
displaying a promotional message associated with the selected brand in the map application; and
allowing a user to select the promotional message and share the promotional message via the mobile communication application.

5. The method of claim 1, wherein:
said one or more menu options further comprises an option to activate a third-party application associated with the selected image entry; and
said third-party application is selected from the group consisting of a mobile shopping application, a mobile service delivery application and an online dating application.

6. The method of claim 1, wherein said mobile communication application comprises a container application.

7. A non-transitory computer readable medium comprising executable instructions, the executable instructions, while executed, causing a processor to perform steps comprising:
receiving a user input in a mobile communication application,
wherein said user input comprises a text entry including a predefined term;
displaying one or more image entries corresponding to the predefined term in the user input,
wherein each of the one or more image entries is associated with one of a plurality of brands;
receiving a first user selection comprising a selected image entry from the displayed image entries,
wherein the selected image entry is associated with a selected brand from the plurality of brands;
in response to said first user selection, displaying a menu comprising one or more menu options associated with the selected brand, the one or more menu options comprising an option to locate a nearest store associated with the selected brand;
receiving a second user selection comprising the option to locate the nearest store associated with the selected brand;
determining a user location where the user input is received;
determining a store location of the nearest store associated with the selected brand, based on the user location; and
displaying the store location on a map of a map application.

8. The non-transitory computer readable medium of claim 7, wherein the map application displays the user location.

9. The non-transitory computer readable medium of claim 8, wherein the selected image entry is displayed in the map proximate to the store location.

10. The non-transitory computer readable medium of claim 7, wherein the executable instructions, while executed, cause the processor to perform further steps comprising:
displaying a promotional message associated with the selected brand in the map application; and
allowing a user to select the promotional message and share the promotional message with others via the mobile communication application.

11. The non-transitory computer readable medium of claim 7, wherein said one or more menu options further comprises an option to activate a third-party application associated with the selected image entry, said third-party application selected from the group consisting of a mobile shopping application, a mobile service delivery application and an online dating application.

12. The non-transitory computer readable medium of claim 7, wherein said mobile communication application comprises a container application.

* * * * *